United States Patent [19]

Park

[11] Patent Number: 5,485,217
[45] Date of Patent: Jan. 16, 1996

[54] LINE TRIPLER FOR NTSC/HDTV DUAL RECEIVER

[75] Inventor: Jong S. Park, Seoul, Rep. of Korea

[73] Assignee: Goldstar Co., Ltd., Seoul, Rep. of Korea

[21] Appl. No.: 141,743

[22] Filed: Oct. 27, 1993

[30] Foreign Application Priority Data

Dec. 29, 1992 [KR] Rep. of Korea .................. 26221/1992

[51] Int. Cl.$^6$ .................................................. H04N 7/01
[52] U.S. Cl. .......................... 348/445; 348/556; 348/458; 348/448
[58] Field of Search ..................................... 348/555, 556, 348/441, 445, 448, 458; H04N 5/46, 7/01

[56] References Cited

U.S. PATENT DOCUMENTS

| | | | |
|---|---|---|---|
| 5,173,774 | 12/1992 | Bretl et al. | 358/140 |
| 5,218,436 | 6/1993 | Sugiyama et al. | 348/445 |
| 5,231,490 | 7/1993 | Park | 348/445 |

*Primary Examiner*—James J. Groody
*Assistant Examiner*—Cheryl Cohen
*Attorney, Agent, or Firm*—Finnegan, Henderson, Farabow, Garrett & Dunner

[57] ABSTRACT

A line tripler for an NTSC/HDTV dual receiver includes a control signal generation section for generating write enable signals and read enable signals. A FIFO line memory section writes each line of an NTSC video signal three times at a predetermined write sampling rate in response to the write enable signals from the control signal generation section to triple each line. The memory section sequentially outputs the stored three lines of the NTSC video signal at a predetermined read sampling rate in response to the plurality of read enable signals from the control signal generation section. The increase in the number of samples of each line of the NTSC video signal is made possible by adjusting the sampling rate or clock signal frequency in reading the stored three lines of the NTSC video signal. A format of the NTSC signal can be converted into an HDTV format of 16:9 or 4:3 aspect ratio.

33 Claims, 24 Drawing Sheets

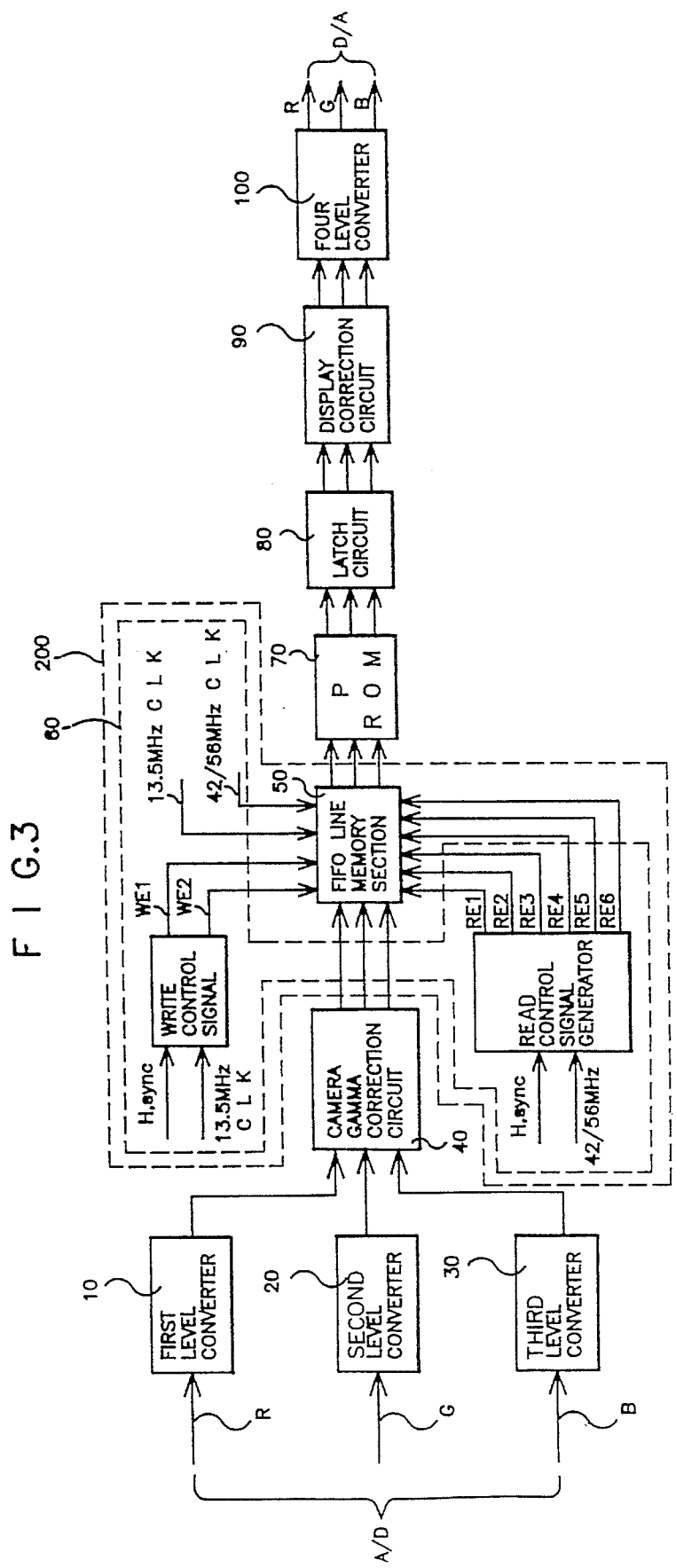

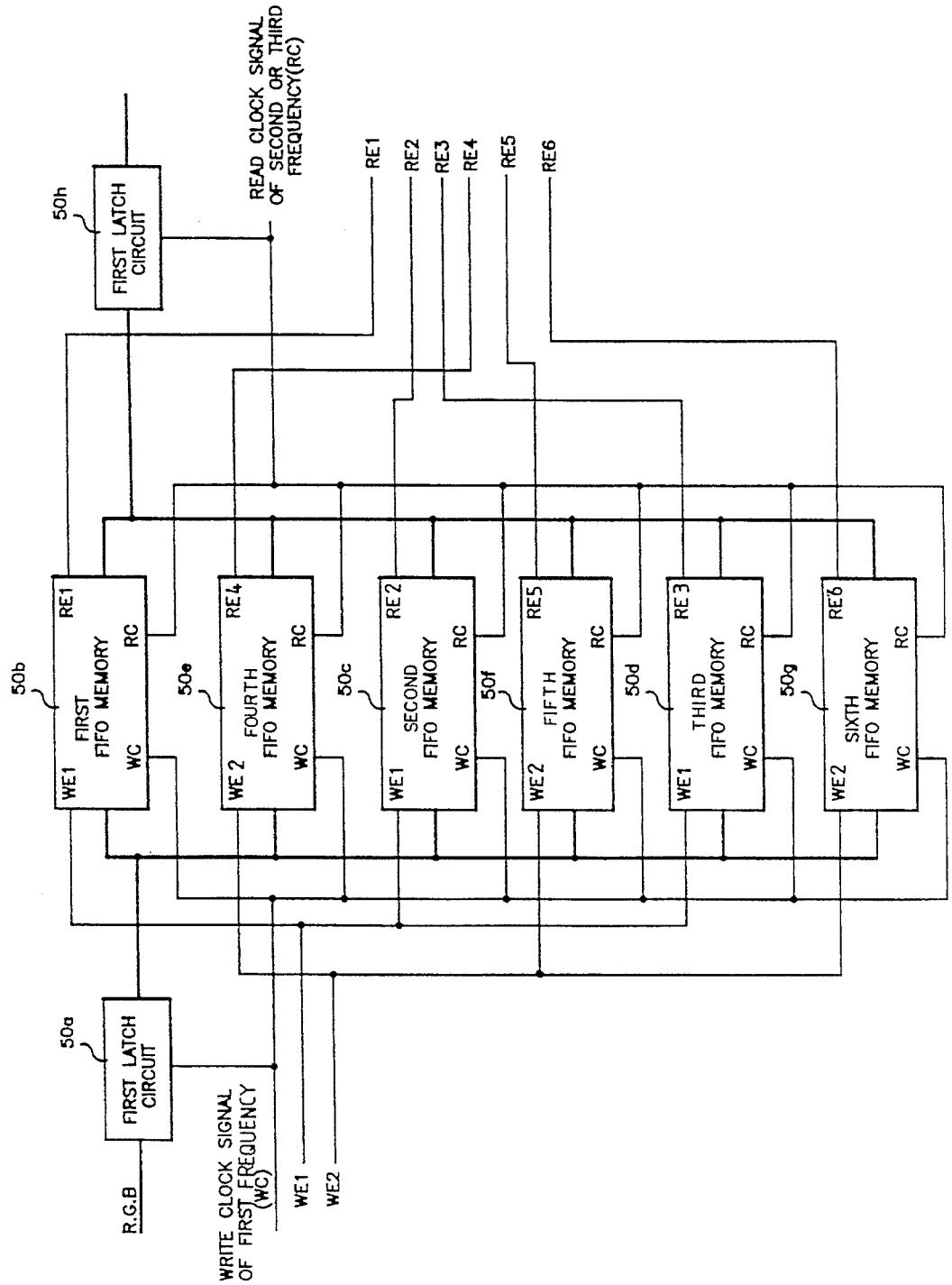

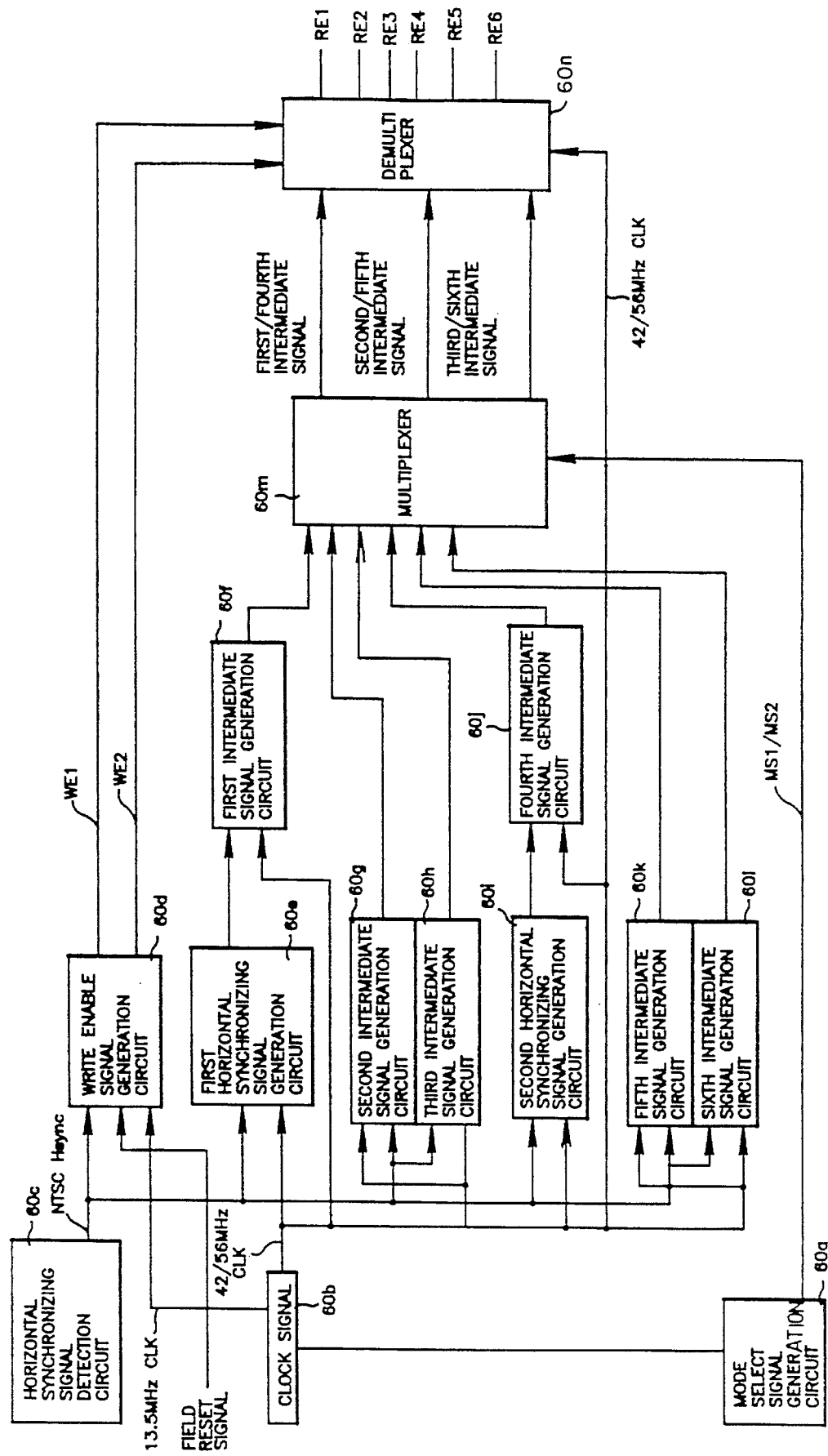

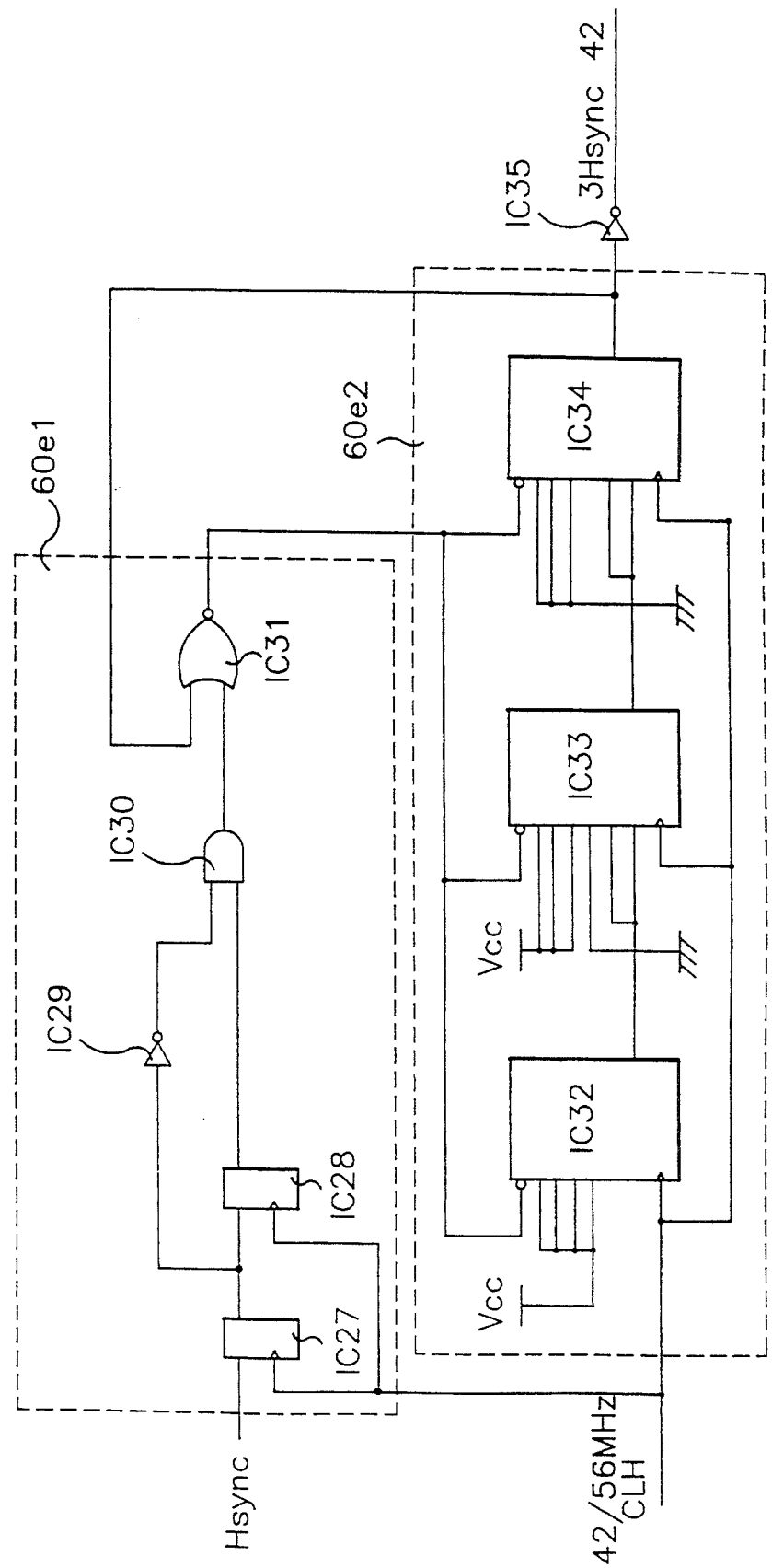
F I G. 8

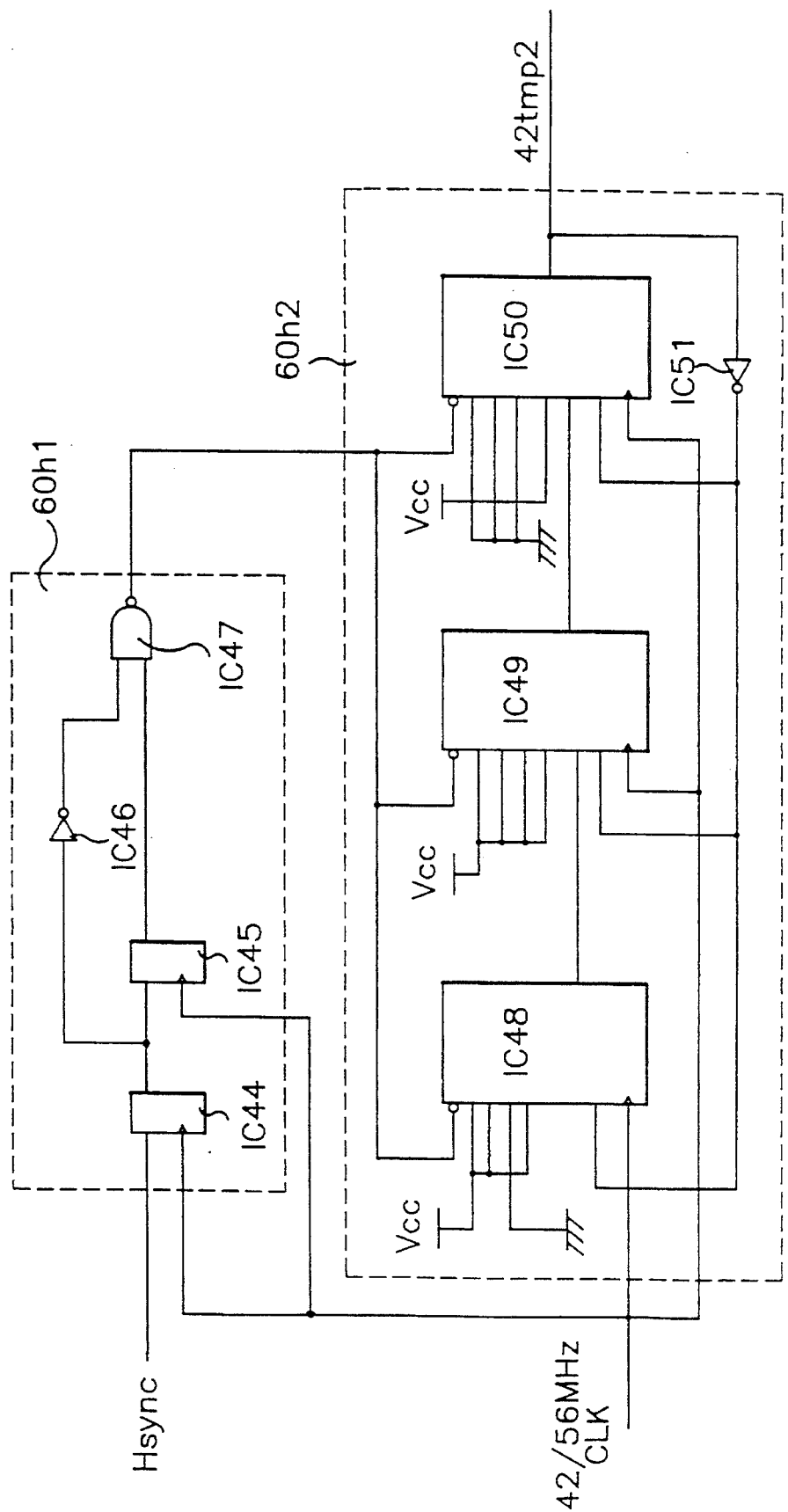
F I G. 10

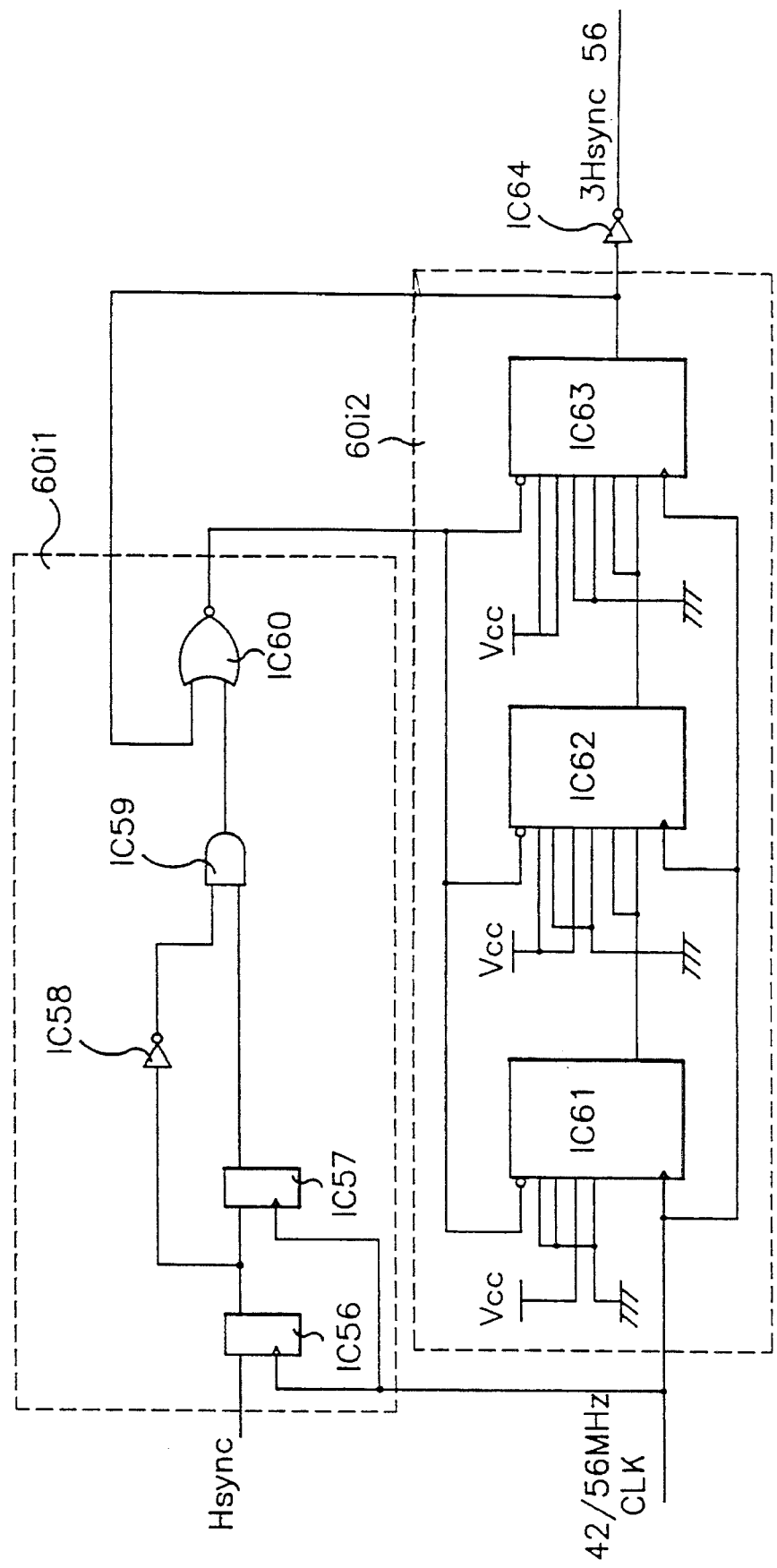
F I G. 12

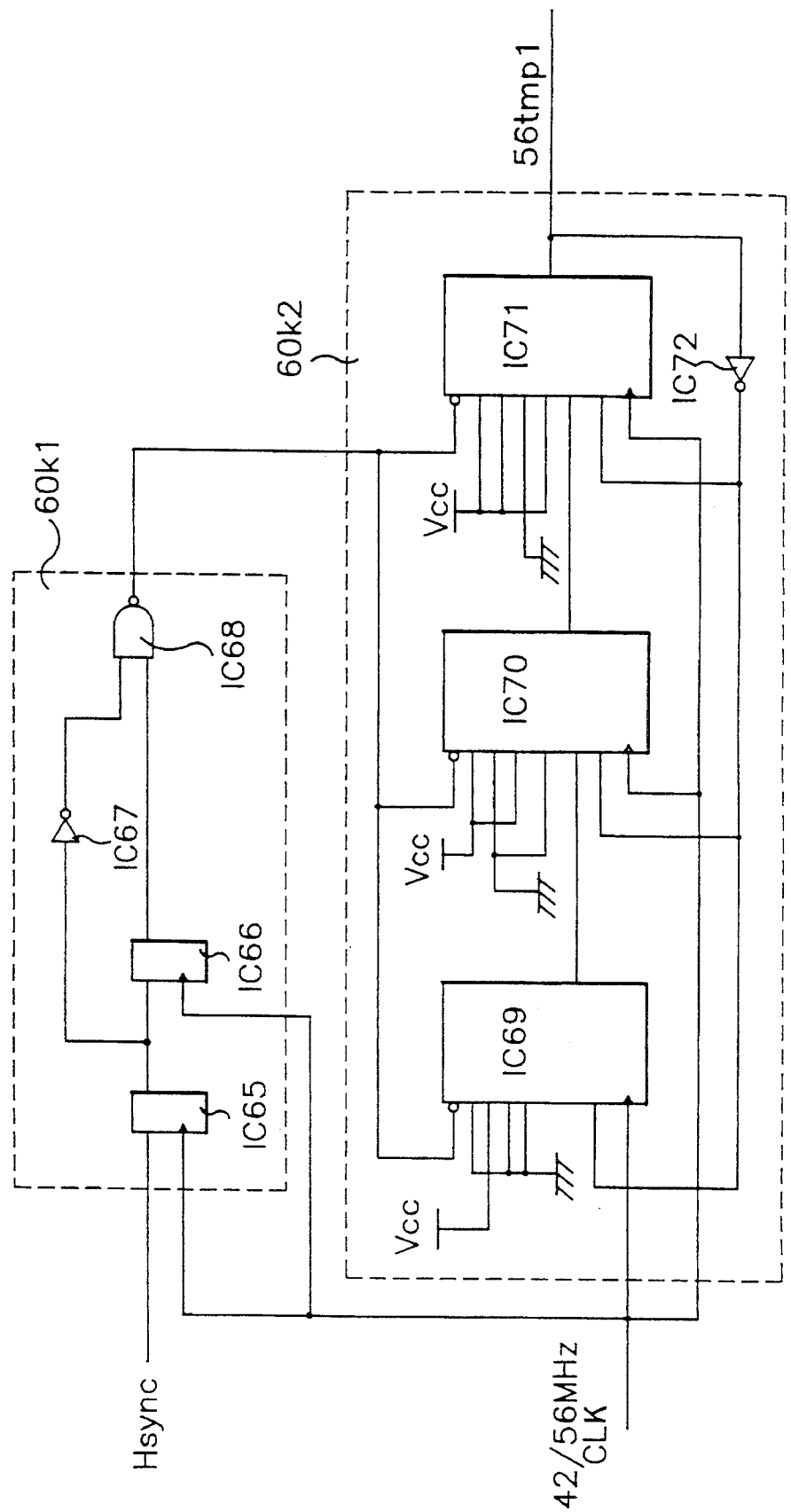
F I G. 13

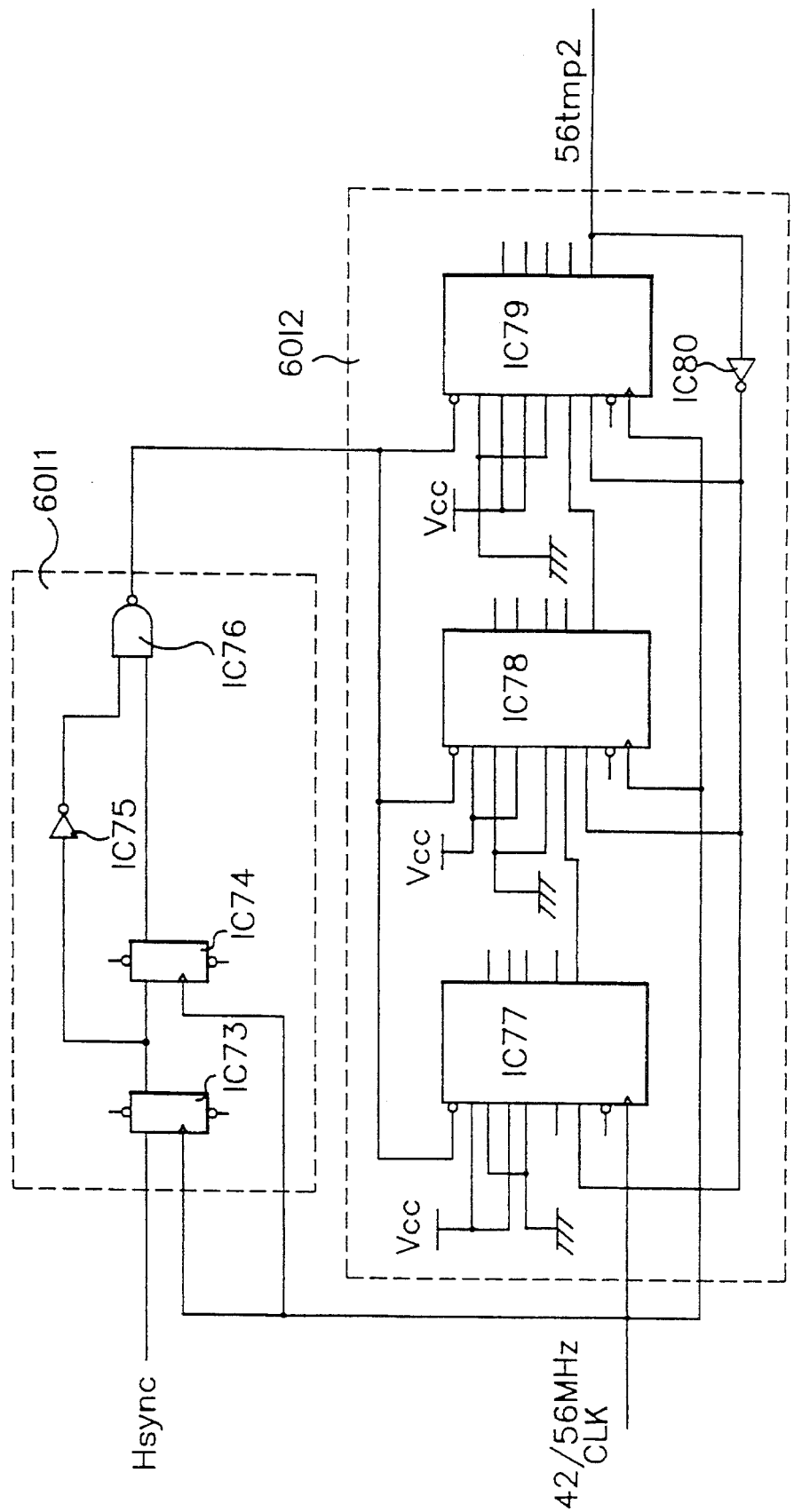
F I G. 14

LINE TRIPLER FOR NTSC/HDTV DUAL RECEIVER

BACKGROUND OF THE INVENTION

1. Field of the Invention

The present invention relates in general to a line tripler for a national television system committee (NTSC)/high definition television (HDTV) dual receiver.

2. Description of the Prior Art

For the purpose of facilitating a better understanding of the present invention, sizes of HDTV and NTSC screens will hereinafter be mentioned before description of the prior art. The size of the active NTSC screen is 720×240 as shown in Fig. 1a, where 720 is the number of horizontal samples and 240 is the number of vertical lines in an interlaced scanning system. The number of the vertical lines is 480 in a non-interlaced scanning system. The size of the active HDTV screen is 1280×720 as shown in Fig. 1b, where 1280 is the number of horizontal samples and 720 is the number of vertical lines.

Generally, a HDTV/NTSC dual receiver has a construction more suitable to reception of a HDTV signal than that of a NTSC signal. For this reason, upon receiving the NTSC signal, the HDTV/NTSC dual receiver must convert a format of the received NTSC signal into that of the HDTV signal for display. Namely, the HDTV/NTSC dual receiver must convert 720× 240 pixels of the NTSC signal into 1280×720 pixels of the HDTV signal. For conversion of the format of the NTSC into that of the HDTV signal, the HDTV/NTSC dual receiver uses directly a memory device of an NTSC receiver to store the NTSC signal and then converts the format of the NTSC signal stored in the memory device into that of the HDTV signal utilizing a conversion circuit. Such a conventional conversion circuit may be provided in a DSC-HDTV system available from Zenith Co., Ltd, U.S.A., and is shown in a block form in FIG. 2, herein.

As shown in FIG. 2, the conventional conversion circuit comprises a line doubler 1 for converting a 720×240 aspect ratio of an NTSC video signal into a 720×480 aspect ratio, and an up-converter 2 for converting the 720×480 aspect ratio of the NTSC video signal from the line doubler 1 into a 1280×720 aspect ratio of an HDTV format. For conversion of the 720×240 aspect ratio of the NTSC video signal of the interlaced scanning system into the 1280×720 aspect ratio of the progressive HDTV format as mentioned above, the vertical lines are tripled and 560 samples must be added in the horizontal direction of the screen.

In the conversion circuit of FIG. 2, the number of the vertical lines of the NTSC video signal is first doubled from 240 to 480 by the line doubler 1 and then increased from 480 to 720 by the up-converter 2. As a result, the format of the NTSC video signal is converted into the HDTV format in the vertical direction of the screen. On the other hand, the up-converter 2 removes a noise of the NTSC video signal through its internal filter and then increases the number of the horizontal samples of each line of the NTSC video signal from 720 to 1280 at the same time as the output of the 720 vertical lines. The increase in the number of the horizontal samples of the NTSC video signal is enabled by a sampling rate controlled by the up-converter 2. As a result, the format of the NTSC video signal is converted into the HDTV format in the horizontal direction of the screen.

However, the above-mentioned conventional conversion circuit has a disadvantage in that the up-converter is complex in construction. This makes the whole construction of the HDTV/NTSC dual receiver relatively complex. Also, the line doubler is high in price, resulting in an increase in the manufacturing cost of the HDTV/NTSC dual receiver.

SUMMARY OF THE INVENTION

Therefore, the present invention has been made in view of the above problems, and it is an object of providing a line tripler for an NTSC/HDTV dual receiver that can simply convert a format of an NTSC signal into that of an HDTV signal by tripling the number of lines of the NTSC signal directly using low cost FiFo line memories.

In accordance with the present invention, the above and other objects can be accomplished by a provision of a line tripler for an NTSC/HDTV dual receiver comprising control signal generation means for generating a plurality of write enable signals and a plurality of read enable signals and FiFo line memory means for writing each line of an NTSC video signal three times at a predetermined write sampling rate in response to the plurality of write enable signals from the control signal generation means to triple it into three lines and sequentially outputting the stored tripled, three lines of the NTSC video signal at a predetermined read sampling rate in response to the plurality of read enable signals from the control signal generation means.

BRIEF DESCRIPTION OF THE DRAWINGS

The above and other objects, features and advantages of the present invention will be more clearly understood from the following detailed description taken in conjunction with the accompanying drawings, in which:

FIG. 3 is a block diagram of an NTSC/HDTV dual receiver comprising a line triplet of the present invention;

FIG. 5 is a block diagram of a FiFo line memory section in the line tripler in FIG. 3 in accordance with the present invention;

FIG. 6 is a block diagram of a control signal generation section in the line tripler in FIG. 3 in accordance with the present invention;

FIG. 8 is a functional block diagram of a first horizontal synchronizing signal generation circuit in the control signal generation section in FIG. 6 in accordance with the embodiment of the present invention;

FIG. 10 is a functional block diagram of a third intermediate signal generation circuit in the control signal generation section in FIG. 6 in accordance with the embodiment of the present invention;

FIG. 12 is a functional block diagram of a second horizontal synchronizing signal generation circuit in the control signal generation section in FIG. 6 in accordance with the embodiment of the present invention;

FIG. 13 is a functional block diagram of a fifth intermediate signal generation circuit in the control signal generation section in FIG. 6 in accordance with the embodiment of the present invention;

FIG. 14 is a functional block diagram of a sixth intermediate signal generation circuit in the control signal generation section in FIG. 6 in accordance with the embodiment of the present invention;

DETAILED DESCRIPTION OF THE PREFERRED EMBODIMENT

Figure 1A:
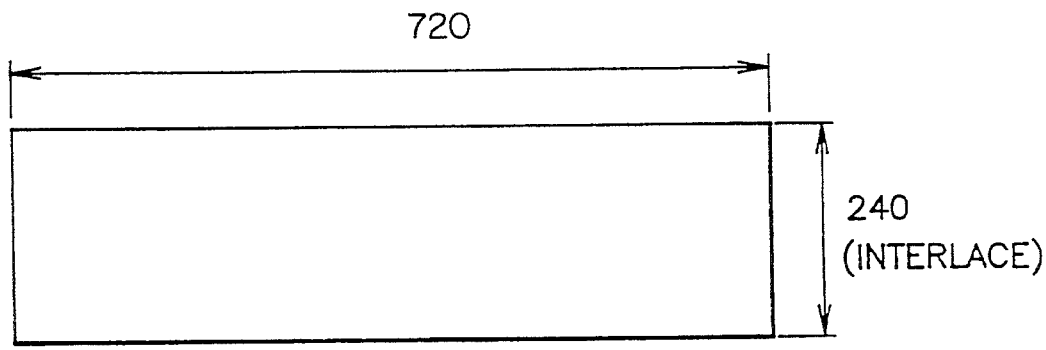
Fig. 1a is a view illustrating an NTSC screen.
Figure 1B:
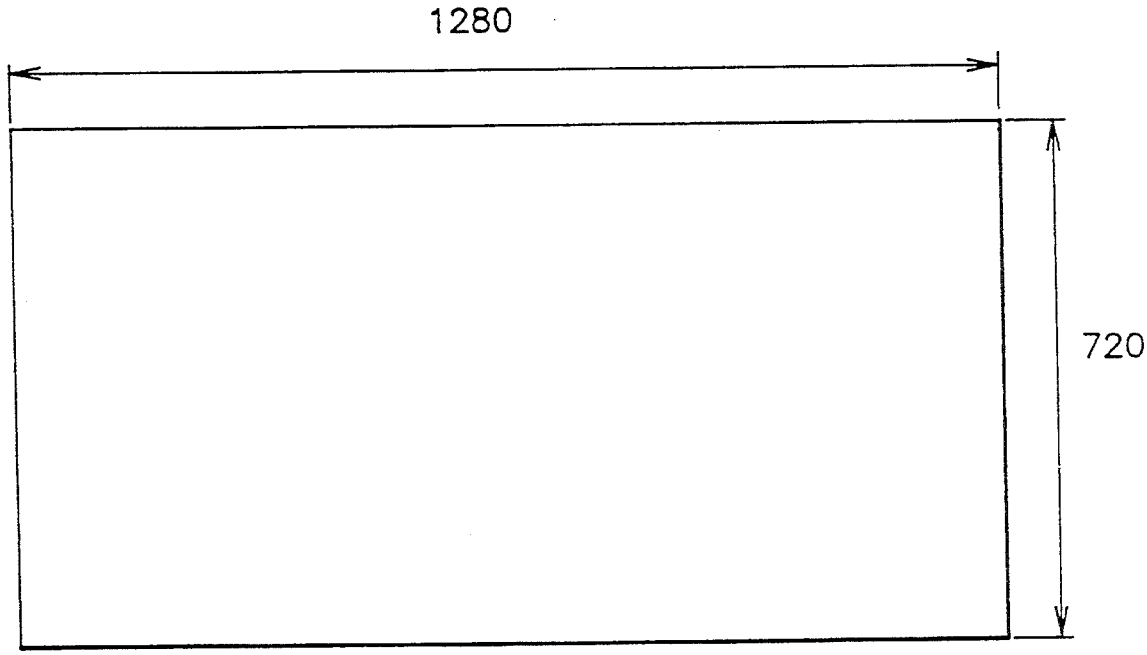
Fig. 1b is a view illustrating an HDTV screen.
Figure 2:
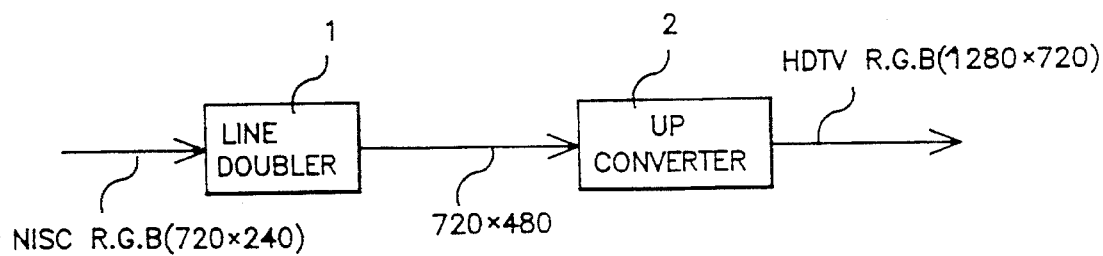
FIG. 2 is a block diagram of a conventional line tripling conversion circuit for an NTSC/HDTV dual receiver.

Referring to FIG. 3, a block diagram of an NTSC/HDTV dual receiver is shown comprising a line tripler of the present invention. As shown in this drawing, in the NTSC/HDTV dual receiver, red (R), green (G) and blue (B) video signals (referred to hereinafter as an NTSC video signal in all) of a digital NTSC signal from an analog/digital (A/D) converter (not shown) are received and converted from emitter coupled logic (ECL) levels (+5 V and −5 V) into transistor-transistor logic (TTL) levels (+5 V and 0 V) by first to third level converters 10, 20 and 30, respectively. This level conversion is performed for the purpose of preventing the video signal from becoming weak due to noise.

The level-converted NTSC video signal is corrected from its non-linear state into a linear state by a camera gamma correction circuit 40. The linear NTSC video signal from the camera gamma correction circuit 40 is applied to a FiFo line memory section 50.

Generally, since a video signal shot by a camera is distorted due to its non-linear characteristic, it must be corrected by the camera gamma correction circuit 40 to have a linear characteristic.

The FiFo line memory section 50 is adapted to store one line of the NTSC video signal three times at a first sampling rate or a write clock signal of a first frequency of 13.5 MHz from a control signal generation section 60 in response to a first or second write enable signals WE1 or WE2 from the control signal generation section 60. Namely, the FiFo line memory section 50 stores the one line of the NTSC video signal as three lines.

Then, the three lines of the NTSC video signal stored in the FiFo line memory section 50 are sequentially read at a second sampling rate or a read clock signal of a second frequency of 42 MHz or a third sampling rate or a read clock signal of a third frequency of 56 MHz from the control signal generation section 60 in response to first to third sequential read enable signals RE1–RE3 or fourth to sixth sequential read signals RE4–RE6 from the control signal generation section 60. As read from the FiFo line memory section 50, the number of pixels of the NTSC video signal is converted from 720 into 1280 in a horizontal direction and the number of lines thereof is converted from 240 into 720 in a vertical direction. That is, a format of the NTSC signal is converted into that of an HDTV signal.

Because the three lines of the NTSC video signal stored in the FiFo line memory section 50 are obtained by tripling the one line of the NTSC video signal, they are weak in or magnitude. For this reason, the three lines of the NTSC video signal from the FiFo line memory section 50 are gain-controlled by a programmable read only memory (PROM) 70 to have uniform weights.

The weighted three lines of the NTSC video signal from the PROM 70 are applied to a display gamma correction circuit 90 through a latch circuit 80. The display gamma correction circuit 90 is adapted to correct the non-linear state of the NTSC video signal of the three lines from the PROM 70 into the linear state to display the NTSC video signal correctly.

A fourth level converter 100 is adapted to convert the TTL level of the NTSC video signal of the three lines from the display gamma correction circuit 90 into the ECL level. Then, the NTSC video signal of the three lines from the fourth level converter 100 is converted into an analog video signal by a digital/analog (D/A) converter (not shown) to be displayed on a screen.

In FIG. 3, the reference numeral 200 designates the line tripler of the present invention.

Figure 4A:
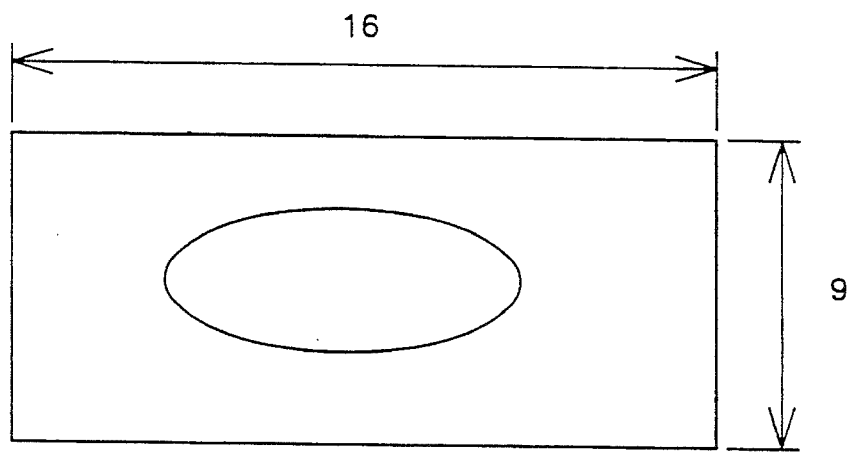
FIG. 4a is a view illustrating a screen in the case where a format of an NTSC signal is converted into an HDTV format of a 16:9 aspect ratio.

On the other hand, in FIG. 3, in the case where the three lines of the NTSC video signal are read from the FiFo line memory section 50 at the sampling rate of the second frequency of 42.388 MHz, the NTSC video signal is displayed on a screen as shown in FIG. 4a. Namely, the NTSC video signal is displayed on the screen with an HDTV format of a 16:9 aspect ratio, which is horizontally stretched as compared with its original state.

Figure 4B:
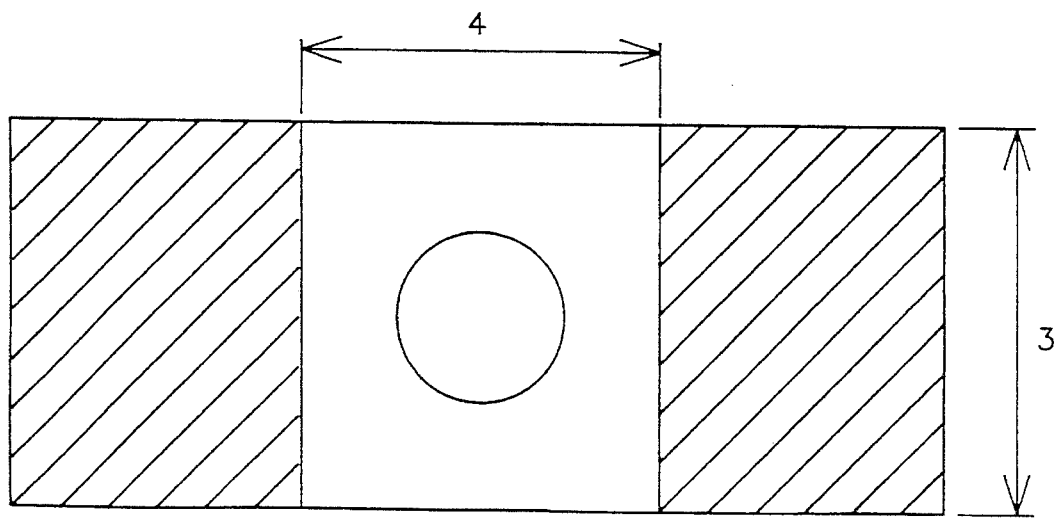
FIG. 4b is a view illustrating a screen in the case where the format of the NTSC signal is converted into an HDTV format of a 4:3 aspect ratio.

Also, in the case where the three lines of the NTSC video signal are read from the FiFo line memory section 50 at the sampling rate of the third frequency of 56.501 MHz, the NTSC video signal is displayed on a screen as shown in FIG. 4b. Namely, the NTSC video signal is naturally displayed on the screen with an HDTV format of a 4:3 aspect ratio. In this case, black blanking images appear at both sides of the screen. The user can selectively display the NTSC video signal on the screen as shown in FIG. 4a or 4b by adjusting the frequency of the read clock signal.

Referring to FIG. 5, there is a block diagram of the FiFo line memory section 50 in the line tripler 200 in FIG. 3 in accordance with the present invention. As shown in this drawing, the FiFo line memory section 50 comprises a first latch circuit 50a for temporarily storing the NTSC video signal from the camera gamma correction circuit 40 in the unit of line at the first sampling rate or the write clock signal of the first frequency of 13.5 MHz from the control signal generation section 60.

First to third FiFo line memories 50b–50d are adapted to simultaneously store one line of the NTSC video signal from the first latch circuit 50a at the first sampling rate or the write clock signal of the first frequency of 13.5 MHz from the control signal generation section 60 in response to the first write enable signal WE1 from the control signal generation section 60. Also, the first to third FiFo line memories 50b–50d are adapted to sequentially output the stored one-lines of the NTSC video signal at the second sampling rate or the read clock signal of the second frequency of 42 MHz or the third sampling rate or the read clock signal of the third frequency of 56 MHz from the control signal generation section 60 in response to the first to third sequential read enable signals RE1–RE3 from the control signal generation section 60.

Fourth to sixth FiFo line memories 50e to 50g are adapted to simultaneously store the next one line of the NTSC video signal from the first latch circuit 50a at the first sampling rate or the write clock signal of the first frequency of 13.5 MHz from the control signal generation section 60 in response to the second write enable signal WE2 from the control signal generation section 60. The second write enable signal WE2 has the opposite level to that of the first write enable signal WE1. Also, the fourth to sixth FiFo line memories 50e to 50g are adapted to sequentially output the stored next one-lines of the NTSC video signal at the second sampling rate or the read clock signal of the second frequency of 42 MHz or the third sampling rate or the read clock signal of the third frequency of 56MHz from the control signal generation section 60 in response to the fourth to sixth sequential read enable signals RE4–RE6 from the control signal generation section 60.

Also, the FiFo line memory section 50 comprises a second latch circuit 50h for temporarily storing the tripled, three lines of the NTSC video signal from the first to third FiFo line memories 50b–50d or from the fourth to sixth FiFo line memories 50e to 50g at the second or third sampling rate from the control signal generation section 60.

Noticeably, the read and write operations of the first to third FiFo memories 50b–50d and the read and write operations of the fourth to sixth FiFo memories 50e to 50g are alternately performed every one horizontal line of the NTSC video signal.

Referring to FIG. 6, a block diagram of the control signal generation section 60 in the line tripler 200 in FIG. 3 is shown in accordance with the present invention. As shown in this drawing, the control signal generation section 60 comprises a mode select signal generation circuit 60a for generating a first mode select signal MS1 to display the NTSC video signal at the 16:9 aspect ratio or a second mode select signal MS2 to display the NTSC video signal at the 4:3 aspect ratio according to a user's selection. A clock signal generation circuit 60b generates the write clock signal of the first frequency of 13.5 MHz and the read clock signal of the second frequency of 42 MHz in response to the first mode select signal MS1 from the mode select signal generation circuit 60a or generating the write clock signal of the first frequency of 13.5 MHz and the read clock signal of the third frequency of 56 MHz in response to the second mode select signal MS2 from the mode select signal generation circuit 60a. A horizontal synchronizing signal detection circuit 60c detects an NTSC horizontal synchronizing signal Hsync from the NTSC video signal. A write enable signal generation circuit 60d for alternately generates the first and second write enable signals WE1 and WE2 of the opposite levels every one horizontal line 1H of the NTSC video signal in response to the NTSC horizontal synchronizing signal Hsync from the horizontal synchronizing signal detection circuit 60c and the write clock signal of the first frequency of 13.5 MHz from the clock signal generation circuit 60b.

A first horizontal synchronizing signal generation circuit 60e is provided in the control signal generation section 60 to input the read clock signal of the second or third frequency from the clock signal generation circuit 60b and the NTSC horizontal synchronizing signal Hsync from the horizontal synchronizing signal detection circuit 60c and to generate three horizontal synchronizing signals in response to the read clock signal of the second frequency every one horizontal line 1H of the NTSC video signal.

A first intermediate signal generation circuit 60f is provided in the control signal generation section 60 to input the read clock signal of the second or third frequency from the clock signal generation circuit 60b and the three horizontal synchronizing signals from the first horizontal synchronizing signal generation circuit 60e. The circuit 60f generates a first intermediate signal in response to the read clock signal of the second frequency whenever it inputs the three horizontal synchronizing signals from the first horizontal synchronizing signal generation circuit 60e.

A second intermediate signal generation circuit 60g is provided in the control signal generation section 60 to input the read clock signal of the second or third frequency from the clock signal generation circuit 60b and the NTSC horizontal synchronizing signal Hsync from the horizontal synchronizing signal detection circuit 60c. The circuit 60h generate a second intermediate signal in response to the read clock signal of the second frequency every one horizontal line 1H of the NTSC video signal.

A third intermediate signal generation circuit 60h is provided in the control signal generation section 60 to input the read clock signal of the second or third frequency from the clock signal generation circuit 60b and the NTSC horizontal synchronizing signal Hsync from the horizontal synchronizing signal detection circuit 60c. The circuit 60h generates a third intermediate signal in response to the read clock signal of the second frequency every one horizontal line 1H of the NTSC video signal.

A second horizontal synchronizing signal generation circuit 60i is provided in the control signal generation section 60 to input the read clock signal of the second or third frequency from the clock signal generation circuit 60b and the NTSC horizontal synchronizing signal Hsync from the horizontal synchronizing signal detection circuit 60c. The circuit 60i generates three horizontal synchronizing signals in response to the read clock signal of the third frequency every one horizontal line 1H of the NTSC video signal, A fourth intermediate signal generation circuit 60j is provided in the control signal generation section 60 to input the read clock signal of the second or third frequency from the clock signal generation circuit 60b and the three horizontal synchronizing signals from the second horizontal synchronizing signal generation circuit 60i. The circuit 60j generates a fourth intermediate signal in response to the read clock signal of the third frequency whenever it inputs the three horizontal synchronizing signals from the second horizontal synchronizing signal generation circuit 60i.

A fifth intermediate signal generation circuit 60k is provided in the control signal generation section 60 to input the read clock signal of the second or third frequency from the clock signal generation circuit 60b and the NTSC horizontal synchronizing signal Hsync from the horizontal synchronizing signal detection circuit 60c. The circuit 60k generates a fifth intermediate signal in response to the read clock signal of the third frequency every one horizontal line 1H of the NTSC video signal.

A sixth intermediate signal generation circuit 60l is provided in the control signal generation section 60 to input the read clock signal of the second or third frequency from the clock signal generation circuit 60b and the NTSC horizontal synchronizing signal Hsync from the horizontal synchronizing signal detection circuit 60c. The circuit 60l generates a sixth intermediate signal in response to the read clock signal of the third frequency every one horizontal line 1H of the NTSC video signal.

The control signal generation section 60 also comprises a multiplexer 60m for inputting the first to sixth intermediate signals from the first to sixth intermediate signal generation circuits 60f–60h and 60j–60l and outputting the first to third intermediate signals in response to the first mode select signal MS1 from the mode select signal generation circuit 60a and the fourth to sixth intermediate signals in response to the second mode select signal MS2 from the mode select signal generation circuit 60a. A demultiplexer 60n, responsive to the read clock signal of the second or third frequency from the clock signal generation circuit 60b, passes the first and second write enable signals WE1 and WE2 from the write enable signal generation circuit 60d after a predetermined delay time and logically combines the first to third intermediate signals or the fourth to sixth intermediate signals from the multiplexer 60m to sequentially generate the first to sixth read enable signals RE1–RE6 in the unit of two horizontal lines 2H of the NTSC video signal.

Noticeably, in FIG. 6, the first horizontal synchronizing signal generation circuit 60e and the first to third intermediate signal generation circuits 60f–60h cooperate to generate the first to third intermediate signals so as to display the NTSC video signal at the 16:9 aspect ratio. The second horizontal synchronizing signal generation circuit 60i and the fourth to sixth intermediate signal generation circuits 60j–60l cooperate to generate the fourth to sixth intermediate signals so as to display the NTSC video signal at the 4:3 aspect ratio.

In other words, upon receiving the read clock signal of the second frequency, only the first horizontal synchronizing signal generation circuit 60e and the first to third intermediate signal generation circuits 60f–60h are normally operated. Also, upon receiving the read clock signal of the third frequency, only the second horizontal synchronizing signal generation circuit 60i and the fourth to sixth intermediate signal generation circuits 60j–60l are normally operated.

Figure 7:
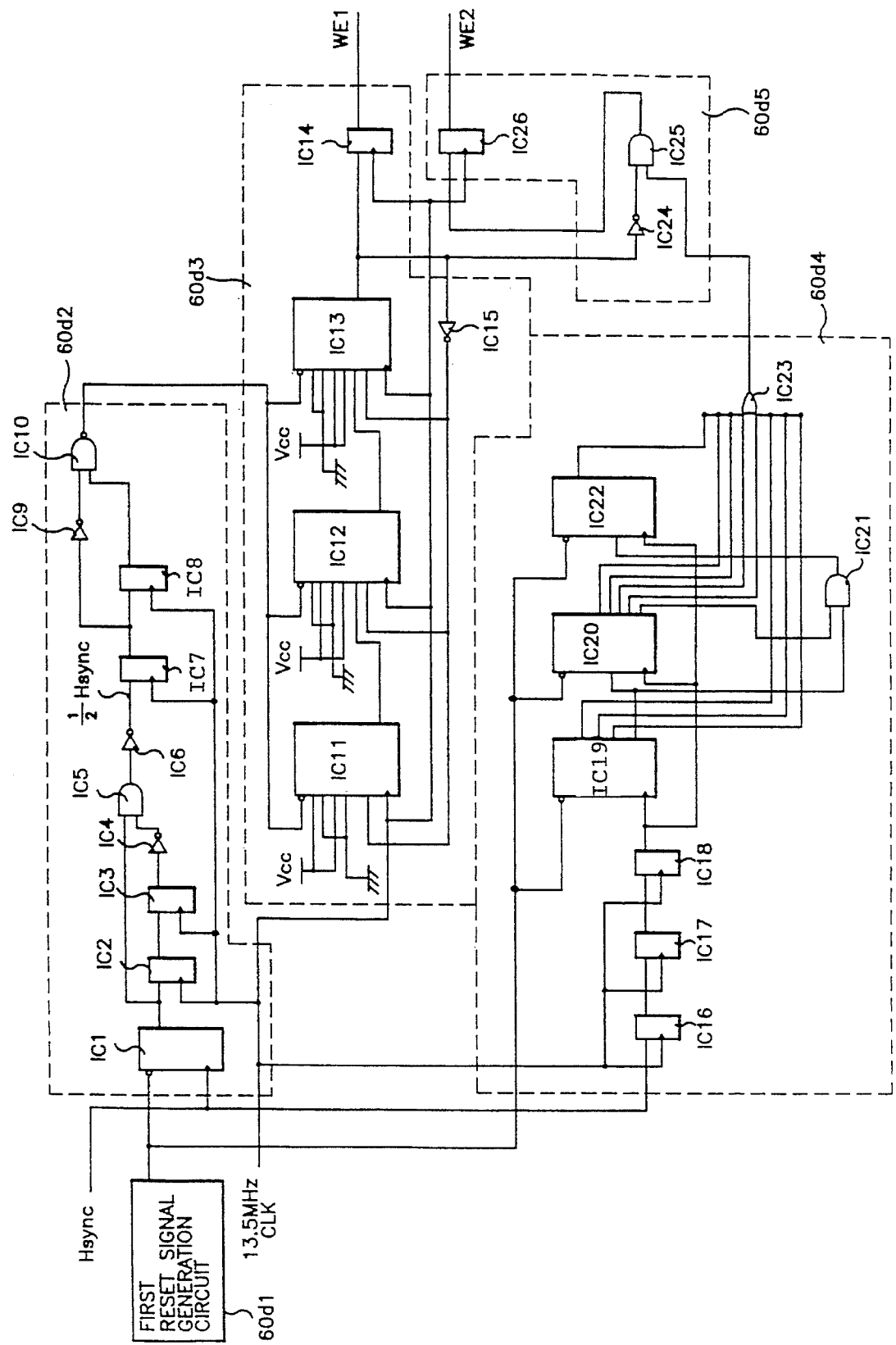
FIG. 7 is a functional block diagram of a write enable signal generation circuit in the control signal generation section in FIG. 6 in accordance with an embodiment of the present invention.

Referring to FIG. 7, a functional block diagram of the write enable signal generation circuit 60d in the control signal generation section 60 in FIG. 6 is shown in accordance with an embodiment of the present invention. As shown in this drawing, the write enable signal generation circuit 60d comprises a first reset signal generation circuit 60d1 for generating a first reset signal. A second reset signal generation circuit 60d2 generates a second reset signal in response to the NTSC horizontal synchronizing signal Hsync from the horizontal synchronizing signal detection circuit 60c, the write clock signal of the first frequency from the clock signal generation circuit 60b and the first reset signal from the first reset signal generation circuit 60d1. A first counting circuit 60d3 performs a counting operation in response to the write clock signal of the first frequency from the clock signal generation circuit 60b and the second reset signal from the second reset signal generation circuit 60d2 and outputs the first write enable signal WE1 in accordance with the counted result.

A second counting circuit 60d4 is provided in the write enable signal generation circuit 60d to perform a counting operation in response to the NTSC horizontal synchronizing signal Hsync from the horizontal synchronizing signal detection circuit 60c and the write clock signal of the first frequency from the clock signal generation circuit 60b. The circuit 60d4 outputs a logic signal in accordance with the counted result. The logic signal from the second counting circuit 60d4 has a first level (for example, 10W) at the initial one horizontal line 1H of the NTSC video signal and a second level at the next one horizontal line 1H of the NTSC video signal.

The write enable signal generation circuit 60d also comprises a logic operation unit 60d5 for inputting the first write enable signal WE1 from the first counting circuit 60d3 and the logic signal from the second counting circuit 60d4, outputting the logic signal from the second counting circuit 60d4 as the second write enable signal WE2 when it has the first level and outputting a logic signal of the opposite level to that of the first write enable signal WE1 as the second write enable signal WE2 when the logic signal from the second counting circuit 60d4 has the second level.

The second reset signal generation circuit 60d2 includes a counter IC1 for inputting the first reset signal from the first reset signal generation circuit 60d1 as its reset signal and the NTSC horizontal synchronizing signal Hsync from the horizontal synchronizing signal detection circuit 60c as its clock signal. A first D flip-flop IC2 inputs an output signal from the counter IC1 as its input signal and the write clock signal of the first frequency from the clock signal generation circuit 60b as its clock signal. A second D flip-flop IC3 inputs an output signal from the first D flip-flop IC2 as its input signal and the write clock signal of the first frequency from the clock signal generation circuit 60b as its clock signal. A first inverter gate IC4 inverts an output signal from the second D flip-flop IC3, and an AND gate IC5 inputs the output signal from the counter IC1 and an output signal from the first inverter gate IC4.

Also, the second reset signal generation circuit 60d2 includes a second inverter gate IC6 for inverting an output signal from the AND gate IC5. A third D flip-flop IC7 inputs an output signal from the second inverter gate IC6 as its input signal and the write clock signal of the first frequency from the clock signal generation circuit 60b as its clock signal. A fourth D flip-flop IC8 inputs an output signal from the third D flip-flop IC7 as its input signal and the write clock signal of the first frequency from the clock signal generation circuit 60b as its clock signal. A third inverter gate IC9 inverts the output signal from the third D flip-flop IC7, and a NAND gate IC10 inputs output signals from the third inverter gate IC9 and the fourth D flip-flop IC8 and outputs the second reset signal.

The first counting circuit 60d3 includes a first counter IC11 for inputting the second reset signal from the second reset signal generation circuit 60d2 as its reset signal and the write clock signal of the first frequency from the clock signal generation circuit 60b as its clock signal and for counting a predetermined number in response to the inputted signals to generate a carry signal. A second counter IC12 inputs the second reset signal from the second reset signal generation circuit 60d2 as its reset signal and the write clock signal of the first frequency from the clock signal generation circuit 60b as its clock signal and counts the carry signal from the first counter IC11 by the predetermined number in response to the inputted signals to generate a carry signal. A third counter IC13 inputs the second reset signal from the second reset signal generation circuit 60d2 as its reset signal and the write clock signal of the first frequency from the clock signal generation circuit 60b as its clock signal and counts the carry signal from the second counter IC12 by the predetermined number in response to the inputted signals to output the first write enable signal WE1.

Also, the first counting circuit 60d3 includes a D flip-flop IC14 for inputting the write clock signal of the first frequency from the clock signal generation circuit 60b as its clock signal and for outputting the first write enable signal WE1 from the third counter IC13 after a predetermined delay time. An inverter gate IC15 inverts the first write enable signal WE1 from the third counter IC13 and outputs the inverted signal as an enable signal or a disable signal commonly to the first to third counters IC11–IC13.

The second counting circuit 60d4 includes a first D flip-flop IC16 for inputting the NTSC horizontal synchronizing signal Hsync from the horizontal synchronizing signal detection circuit 60c as its input signal and the write clock signal of the first frequency from the clock signal generation circuit 60b as its clock signal. A second D flip-flop IC17 inputs an output signal from the first D flip-flop IC16 as its input signal and the write clock signal of the first frequency from the clock signal generation circuit 60b as its clock signal. A third D flip-flop IC18 inputs an output signal from the second D flip-flop IC17 as its input signal and the write clock signal of the first frequency from the clock signal generation circuit 60b as its clock signal.

A first counter IC19 is provided in the second counting circuit 60d4 to input the first reset signal from the first reset signal generation circuit 60d1 as its reset signal and an output signal from the third D flip-flop IC18 as its clock signal. The counter IC19 generates first to fourth output signals in response to the inputted signals.

A second counter IC20 is provided in the second counting circuit 60d4 to input the first reset signal from the first reset signal generation circuit 60d1 as its reset signal, the output signal from the third D flip-flop IC18 as its clock signal and the fourth output signal from the first counter IC19 as its input signal. The counter IC20 generates first to fifth output signals in response to the inputted signals.

Also, the second counting circuit 60d4 includes an AND gate IC21 for inputting the fourth output signal from the first counter IC19 and the fifth output signal from the second counter IC20. A third counter IC22 inputs the first reset signal from the first reset signal generation circuit 60d1 as its reset signal, the output signal from the third D flip-flop IC18 as its clock signal and an output signal from the AND gate IC21 as its input signal. An OR gate IC23 inputs the remaining output signals from the first counter IC19, the remaining output signals from the second counter IC20 and an output signal from the third counter IC22 and outputs the logic signal of the first or second level.

The logic operation unit 60d5 includes an inverter gate IC24 for inverting the first write enable signal WE1 from the first counting circuit 60d3. An AND gate IC25 for inputs the logic signal from the second counting circuit 60d4 and an output signal from the inverter gate IC24 and outputs the second write enable signal WE2. A D flip-flop IC26 inputs the write clock signal of the first frequency from the clock signal generation circuit 60b as its clock signal and outputs the second write enable signal WE2 from the AND gate IC25 after a predetermined delay time.

Referring to FIG. 8, a functional block diagram of the first horizontal synchronizing signal generation circuit 60e in the control signal generation section 60 in FIG. 6 is shown in accordance with the embodiment of the present invention. As shown in this drawing, the first horizontal synchronizing signal generation circuit 60e comprises a reset signal generation circuit 60e1 for generating a reset signal in response to the read clock signal of the second frequency from the clock signal generation circuit 60b and the NTSC horizontal synchronizing signal Hsync from the horizontal synchronizing signal detection circuit 60c. A counting circuit 60e2 performs a counting operation in response to the reset signal from the reset signal generation circuit 60e1 and the read clock signal of the second frequency from the clock signal generation circuit 60b and outputs the three horizontal synchronizing signals 3Hsync42 in accordance with the counted result.

The reset signal generation circuit 60e1 includes a first D flip-flop IC27 for inputting the NTSC horizontal synchronizing signal Hsync from the horizontal synchronizing signal detection circuit 60c as its input signal and the read clock signal of the second frequency from the clock signal generation circuit 60b as its clock signal. A second D flip-flop IC28 inputs an output signal from the first D flip-flop IC27 as its input signal and the read clock signal of the second frequency from the clock signal generation circuit 60b as its clock signal. An inverter gate IC29 inverts the output signal from the first D flip-flop IC27, an AND gate IC30 inputs output signals from the second D flip-flop IC28 and the inverter gate IC29, and a NOR gate IC31 inputs inverted ones of the three horizontal synchronizing signals 3Hsync42 from the counting circuit 60e2 and an output signal from the AND gate IC30 and outputs the reset signal.

The counting circuit 60e2 includes a first counter IC32 for inputting the reset signal from the reset signal generation circuit 60e1 as its reset signal and the read clock signal of the second frequency from the clock signal generation circuit 60b as its clock signal and for counting a predetermined number in response to the inputted signals to generate a carry signal. A second counter IC33 inputs the reset signal from the reset signal generation circuit 60e1 as its reset signal, the read clock signal of the second frequency from the clock signal generation circuit 60b as its clock signal and the carry signal from the first counter IC32 as its enable or disable signal and counts the carry signal from the first counter IC32 by the predetermined number to generate a carry signal.

A third counter IC34 is provided in the counting circuit 60e2 to input the reset signal from the reset signal generation circuit 60e1 as its reset signal, the read clock signal of the second frequency from the clock signal generation circuit 60b as its clock signal and the carry signal from the second counter IC33 as its enable or disable signal. The counter IC34 counts the carry signal from the second counter IC33 by the predetermined number to output inverted ones of the three horizontal synchronizing signals 3Hsync42.

An inverter gate IC35 acts to invert the output signals from the third counter IC34 to output the three horizontal synchronizing signals 3Hsync42.

Figure 9:
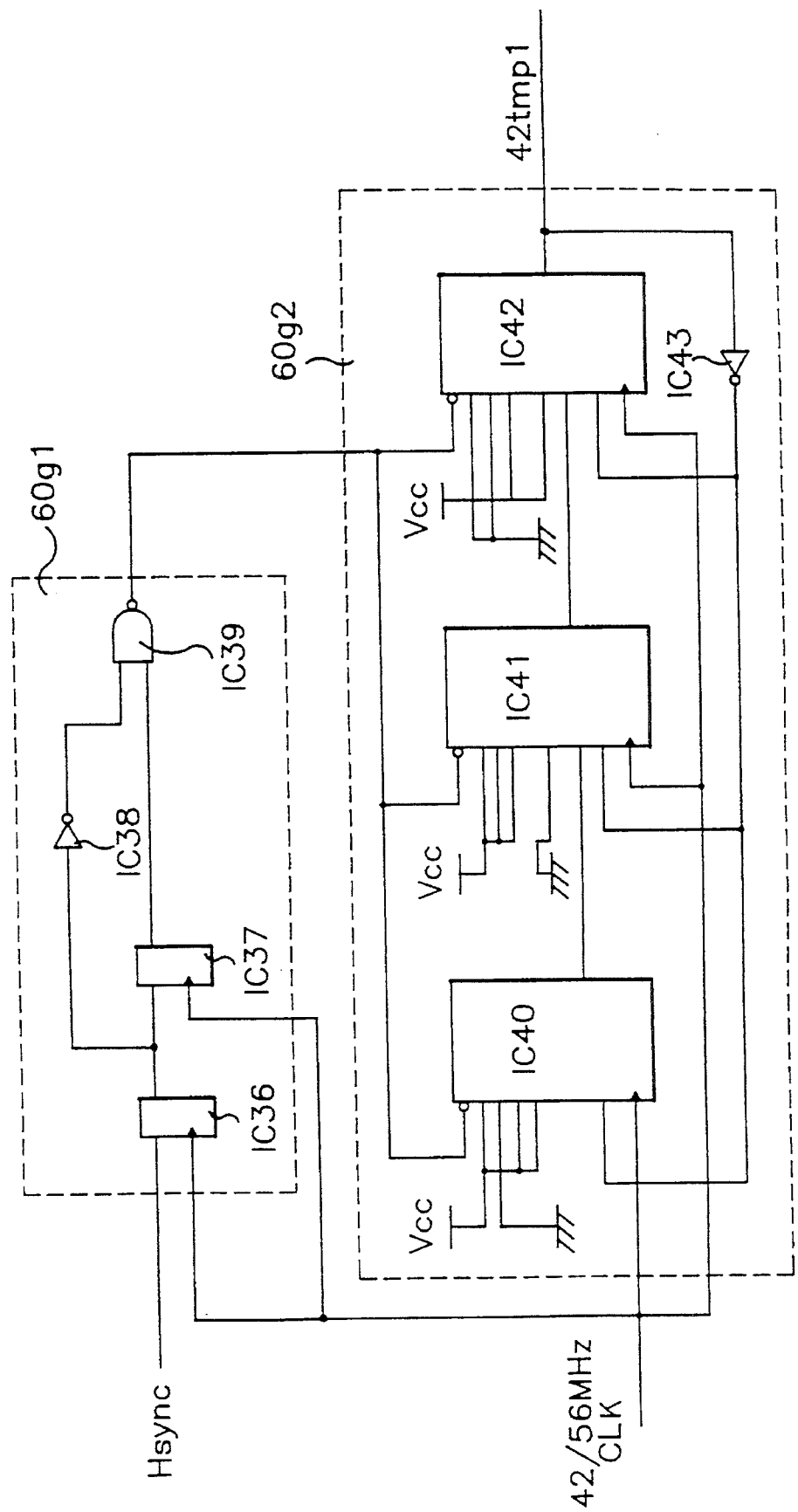
FIG. 9 is a functional block diagram of a second intermediate signal generation circuit in the control signal generation section in FIG. 6 in accordance with the embodiment of the present invention.

Referring to FIG. 9, a functional block diagram of the second intermediate signal generation circuit 60g in the control signal generation section 60 in FIG. 6 is shown in accordance with the embodiment of the present invention. As shown in this drawing, the second intermediate signal generation circuit 60g comprises a reset signal generation circuit 60g1 for generating a reset signal in response to the read clock signal of the second frequency from the clock signal generation circuit 60b and the NTSC horizontal synchronizing signal Hsync from the horizontal synchronizing signal detection circuit 60c. A counting circuit 60g2 performs a counting operation in response to the reset signal from the reset signal generation circuit 60g1 and the read clock signal of the second frequency from the clock signal generation circuit 60b and outputs the second intermediate signal in accordance with the counted result.

The reset signal generation circuit 60g1 includes a first D flip-flop IC36 for inputting the NTSC horizontal synchronizing signal Hsync from the horizontal synchronizing signal detection circuit 60c as its input signal and the read clock signal of the second frequency from the clock signal generation circuit 60b as its clock signal. A second D flip-flop IC37 for inputs an output signal from the first D flip-flop IC36 as its input signal and the read clock signal of the second frequency from the clock signal generation circuit 60b as its clock signal. An inverter gate IC38 inverts the output signal from the first D flip-flop IC36, and a NAND gate IC39 inputs output signals from the second D flip-flop IC37 and the inverter gate IC38 and outputs the reset signal.

The counting circuit 60g2 includes a first counter IC40 for inputting the reset signal from the reset signal generation circuit 60g1 as its reset signal and the read clock signal of the second frequency from the clock signal generation circuit 60b as its clock signal and for counting a predetermined number in response to the inputted signals to generate a carry signal.

A second counter IC41 is provided in the counting circuit 60g2 to input the reset signal from the reset signal generation circuit 60g1 as its reset signal and the read clock signal of the second frequency from the clock signal generation circuit 60b as its clock signal. The counter IC41 counts the carry signal from the first counter IC40 by the predetermined number in response to the inputted signals to generate a carry signal.

A third counter IC42 is adapted to input the reset signal from the reset signal generation circuit 60g1 as its reset signal and the read clock signal of the second frequency from the clock signal generation circuit 60b as its clock signal and count the carry signal from the second counter IC41 by the predetermined number in response to the inputted signals to output the second intermediate signal every one horizontal line 1H of the NTSC video signal.

An inverter gate IC43 acts to invert the second intermediate signal from the third counter IC42 and output the inverted signal as an enable signal or a disable signal commonly to the first to third counters IC40–IC42.

Referring to FIG. 10, a functional block diagram of the third intermediate signal generation circuit 60h in the control signal generation section 60 in FIG. 6 is shown in accordance with the embodiment of the present invention. As shown in this figure, the third intermediate signal generation circuit 60h comprises a reset signal generation circuit 60h1 and a counting circuit 60h2 in a similar manner to that of the second intermediate signal generation circuit 60g in FIG. 9, with the exception that initial values of first to third counters IC48–IC50 in the counting circuit 60h2 are different from those of the first to third counters IC40–IC42 in the counting circuit 60g2. Hence, the third intermediate signal generation circuit 60h generates the third intermediate signal of a width narrower than that of the second intermediate signal from the second intermediate signal generation circuit 60g every one horizontal line 1H of the NTSC video signal.

Figure 11:
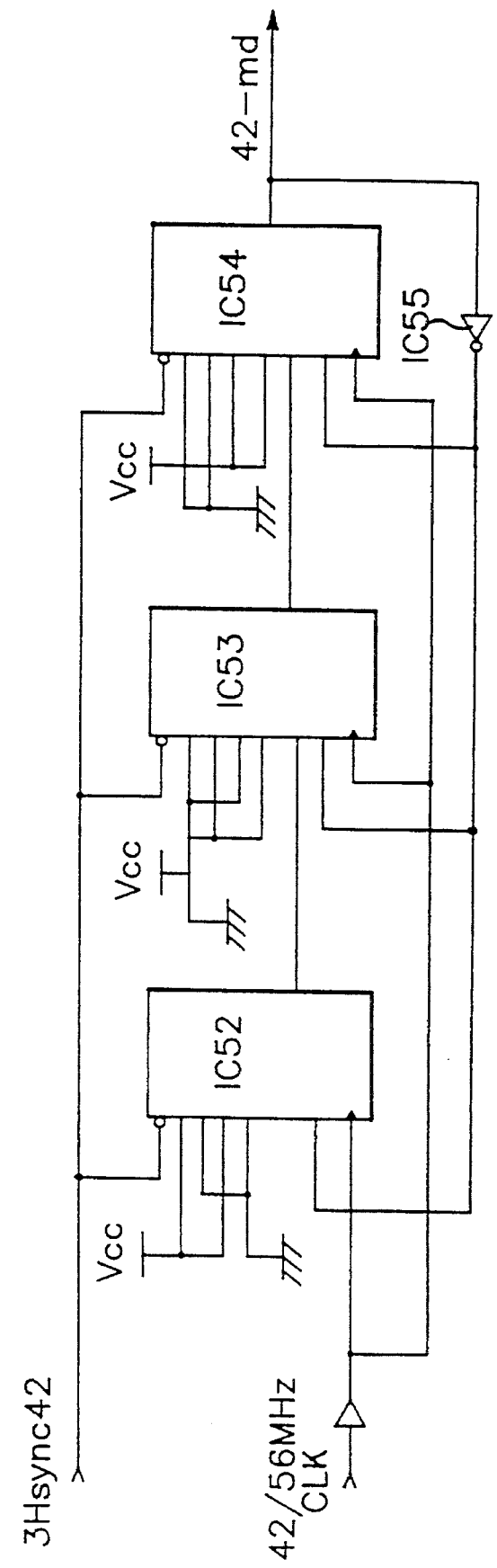
FIG. 11 is a functional block diagram of a first intermediate signal generation circuit in the control signal generation section in FIG. 6 in accordance with the embodiment of the present invention.

Referring to FIG. 11, a functional block diagram of the first intermediate signal generation circuit 60f in the control signal generation section 60 in FIG. 6 is shown in accordance with the embodiment of the present invention. As shown in this drawing, the first intermediate signal generation circuit 60f comprises a first counter IC52 for inputting the three horizontal synchronizing signals 3Hsync42 from the first horizontal synchronizing signal generation circuit 60e as its reset signals and the read clock signal of the second frequency from the clock signal generation circuit 60b as its clock signal and for counting a predetermined number in response to the inputted signals to generate a carry signal.

A second counter IC53 is provided in the first intermediate signal generation circuit 60f to input the three horizontal synchronizing signals 3Hsync42 from the first horizontal synchronizing signal generation circuit 60e as its reset signals and the read clock signal of the second frequency from the clock signal generation circuit 60b as its clock signal. The counter IC53 counts the carry signal from the first counter IC52 by the predetermined number in response to the inputted signals to generate a carry signal.

A third counter IC54 is provided in the first intermediate signal generation circuit 60f to input the three horizontal synchronizing signals 3Hsync42 from the first horizontal synchronizing signal generation circuit 60e as its reset signals and the read clock signal of the second frequency from the clock signal generation circuit 60b as its clock signal. The counter IC54 counts the carry signal from the second counter IC53 by the predetermined number in response to the inputted signals to output the first intermediate signal every one horizontal line 1H of the NTSC video signal.

An inverter gate IC55 is adapted to invert the first intermediate signal from the third counter IC54 and output the inverted signal as an enable signal or a disable signal commonly to the first to third counters IC52–IC54.

Referring to FIG. 12, there is shown a functional block diagram of the second horizontal synchronizing signal generation circuit 60i in the control signal generation section 60 in FIG. 6 is shown in accordance with the embodiment of the present invention. As shown in this figure, the second horizontal synchronizing signal generation circuit 60i comprises a reset signal generation circuit 60i1 for generating a reset signal in response to the read clock signal of the third frequency from the clock signal generation circuit 60b and the NTSC horizontal synchronizing signal Hsync from the horizontal synchronizing signal detection circuit 60c. A counting circuit 60i2 performs a counting operation in response to the reset signal from the reset signal generation circuit 60i1 and the read clock signal of the third frequency from the clock signal generation circuit 60b and outputs the three horizontal synchronizing signals 3Hsync56 in accordance with the counted result.

The reset signal generation circuit 60i1 includes a first D flip-flop IC56 for inputting the NTSC horizontal synchronizing signal Hsync from the horizontal synchronizing signal detection circuit 60c as its input signal and the read clock signal of the third frequency from the clock signal generation circuit 60b as its clock signal.

A second D flip-flop IC57 is provided in the reset signal generation circuit 60i1 to input an output signal from the first D flip-flop IC56 as its input signal and the read clock signal of the third frequency from the clock signal generation circuit 60b as its clock signal.

An inverter gate IC58 is adapted to invert the output signal from the first D flip-flop IC56.

Also, the reset signal generation circuit 60i1 includes an AND gate IC59 for inputting output signals from the second D flip-flop IC57 and the inverter gate IC58, and a NOR gate IC60 for inputting inverted ones of the three horizontal synchronizing signals 3Hsync56 from the counting circuit 60i2 and an output signal from the AND gate IC59 and outputting the reset signal.

The counting circuit 60i2 includes a first counter IC61 for inputting the reset signal from the reset signal generation circuit 60i1 as its reset signal and the read clock signal of the third frequency from the clock signal generation circuit 60b as its clock signal and for counting a predetermined number in response to the inputted signals to generate a carry signal. A second counter IC62 inputs the reset signal from the reset signal generation circuit 60i1 as its reset signal, the read clock signal of the third frequency from the clock signal generation circuit 60b as its clock signal and the carry signal from the first counter IC61 as its enable or disable signal. The counter IC62 counts the carry signal from the first counter IC61 by the predetermined number to generate a carry signal.

A third counter IC63 is provided in the counting circuit 60i2 to input the reset signal from the reset signal generation circuit 60i1 as its reset signal, the read clock signal of the third frequency from the clock signal generation circuit 60b as its clock signal and the carry signal from the second counter IC62 as its enable or disable signal. The counter IC63 counts the carry signal from the second counter IC62 by the predetermined number to output inverted ones of the three horizontal synchronizing signals 3Hsync56.

An inverter gate IC64 is adapted to invert the output signals from the third counter IC63 to output the three horizontal synchronizing signals 3Hsync56.

The construction of the second horizontal synchronizing signal generation circuit 60i in FIG. 12 is substantially the same as that of the first horizontal synchronizing signal generation circuit 60e in FIG. 8, with the exception that initial values of the first to third counters IC61–IC63 in the counting circuit 60i2 are different from those of the first to third counters IC32–IC34 in the counting circuit 60e2. As a result, upon receiving the read clock signal of the second frequency, only the first horizontal synchronizing signal generation circuit 60e and the first to third intermediate signal generation circuits 60f–60h normally operate, while the second horizontal synchronizing signal generation circuit 60i and the fourth to sixth intermediate signal generation circuits 60j–60l do not operate. On the contrary, upon receiving the read clock signal of the third frequency, only the second horizontal synchronizing signal generation circuit 60i and the fourth to sixth intermediate signal generation circuits 60j–60l normally operate, while the first horizontal synchronizing signal generation circuit 60e and the first to third intermediate signal generation circuits 60f–60h do not operate.

Referring to FIG. 13, a functional block diagram of the fifth intermediate signal generation circuit 60k in the control signal generation section 60 in FIG. 6 is shown in accordance with the embodiment of the present invention. As shown in this drawing, the fifth intermediate signal generation circuit 60k comprises a reset signal generation circuit 60k1 for generating a reset signal in response to the read clock signal of the third frequency from the clock signal generation circuit 60b and the NTSC horizontal synchronizing signal Hsync from the horizontal synchronizing signal detection circuit 60c. A counting circuit 60k2 performs a counting operation in response to the reset signal from the reset signal generation circuit 60k1 and the read clock signal of the third frequency from the clock signal generation circuit 60b and outputs the fifth intermediate signal in accordance with the counted result.

The reset signal generation circuit 60k1 includes a first D flip-flop IC65 for inputting the NTSC horizontal synchronizing signal Hsync from the horizontal synchronizing signal detection circuit 60c as its input signal and the read clock signal of the third frequency from the clock signal generation circuit 60b as its clock signal. A second D flip-flop IC66 inputs an output signal from the first D flip-flop IC65 as its input signal and the read clock signal of the third frequency from the clock signal generation circuit 60b as its clock signal. An inverter gate IC67 inverts the output signal from the first D flip-flop IC65, and a NAND gate IC68 inputs output signals from the second D flip-flop IC66 and the inverter gate IC67 and outputs the reset signal.

The counting circuit 60k2 includes a first counter IC69 for inputting the reset signal from the reset signal generation circuit 60k1 as its reset signal and the read clock signal of the third frequency from the clock signal generation circuit 60b as its clock signal. The counter IC69 counts a predetermined number in response to the inputted signals to generate a carry signal. A second counter IC70 inputs the reset signal from the reset signal generation circuit 60k1 as its reset signal and the read clock signal of the third frequency from the clock signal generation circuit 60b as its clock signal. The counter IC70 counts the carry signal from the first counter IC69 by the predetermined number in response to the inputted signals to generate a carry signal.

A third counter IC71 is provided in the counting circuit 60k2 to input the reset signal from the reset signal generation circuit 60k1 as its reset signal and the read clock signal of the third frequency from the clock signal generation circuit 60b as its clock signal. The counter IC71 counts the carry signal from the second counter IC70 by the predetermined number in response to the inputted signals to output the fifth intermediate signal every one horizontal line 1H of the NTSC video signal.

An inverter gate IC72 is adapted to invert the fifth intermediate signal from the third counter IC71 and output the inverted signal as an enable signal or a disable signal commonly to the first to third counters IC69–IC71.

Referring to FIG. 14, a functional block diagram of the sixth intermediate signal generation circuit 60l in the control signal generation section 60 in FIG. 6 is shown in accordance with the embodiment of the present invention. As shown in this figure, the sixth intermediate signal generation circuit 60*l* comprises a reset signal generation circuit 60*l*1 and a counting circuit 60*l*2 in a similar manner to that of the fifth intermediate signal generation circuit 60*k* in FIG. 13, with the exception that initial values of first to third counters IC77–IC79 in the counting circuit 60*l*2 are different from those of the first to third counters IC69–IC71 in the counting circuit 60*k*2. Hence, the sixth intermediate signal generation circuit 60*l* generates the sixth intermediate signal of a width narrower than that of the fifth intermediate signal from the fifth intermediate signal generation circuit 60*k* every one horizontal line 1H of the NTSC video signal.

Figure 15:
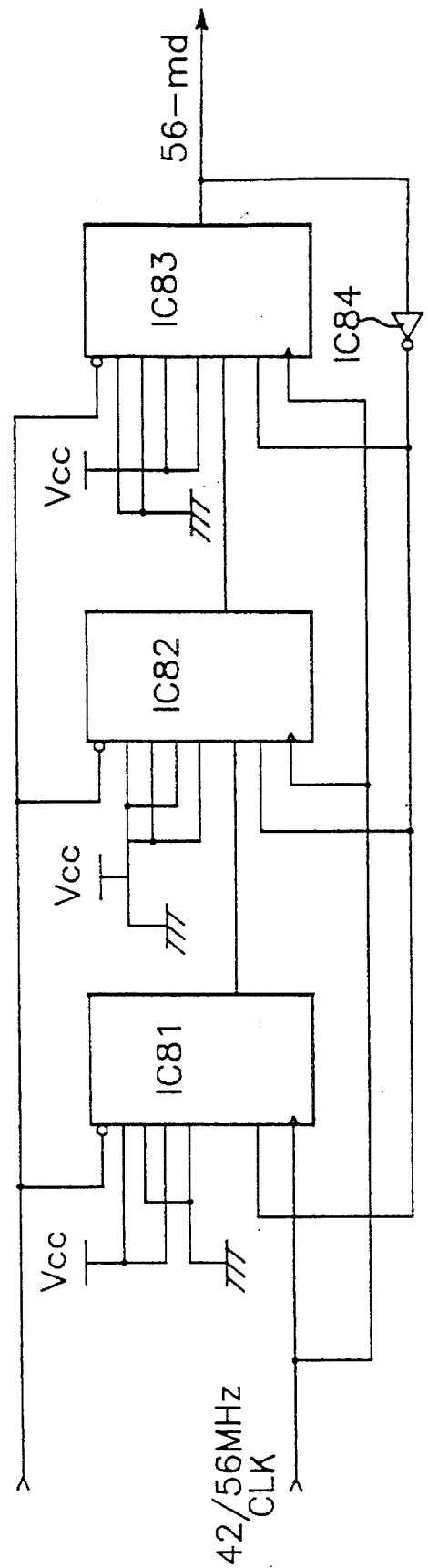
FIG. 15 is a functional block diagram of a fourth intermediate signal generation circuit in the control signal generation section in FIG. 6 in accordance with the embodiment of the present invention.

Referring to FIG. 15, a functional block diagram of the fourth intermediate signal generation circuit 60*j* in the control signal generation section 60 in FIG. 6 is shown in accordance with the embodiment of the present invention. As shown in this figure, the fourth intermediate signal generation circuit 60*j* comprises a first counter IC81 for inputting the three horizontal synchronizing signals 3Hsync56 from the second horizontal synchronizing signal generation circuit 60*i* as its reset signals and the read clock signal of the third frequency from the clock signal generation circuit 60*b* as its clock signal and for counting a predetermined number in response to the inputted signals to generate a carry signal.

A second counter IC82 is provided in the fourth intermediate signal generation circuit 60*j* to input the three horizontal synchronizing signals 3Hsync56 from the second horizontal synchronizing signal generation circuit 60*i* as its reset signals and the read clock signal of the third frequency from the clock signal generation circuit 60*b* as its clock signal. The counter IC82 counts the carry signal from the first counter IC81 by the predetermined number in response to the inputted signals to generate a carry signal.

A third counter IC83 is adapted to input the three horizontal synchronizing signals 3Hsync56 from the second horizontal synchronizing signal generation circuit 60*i* as its reset signals and the read clock signal of the third frequency from the clock signal generation circuit 60*b* as its clock signal. The counter IC83 counts the carry signal from the second counter IC82 by the predetermined number in response to the inputted signals to output the fourth intermediate signal every one horizontal line 1H of the NTSC video signal.

An inverter gate IC84 acts to invert the fourth intermediate signal from the third counter IC83 and output the inverted signal as an enable signal or a disable signal commonly to the first to third counters IC81–IC83.

Figure 16:
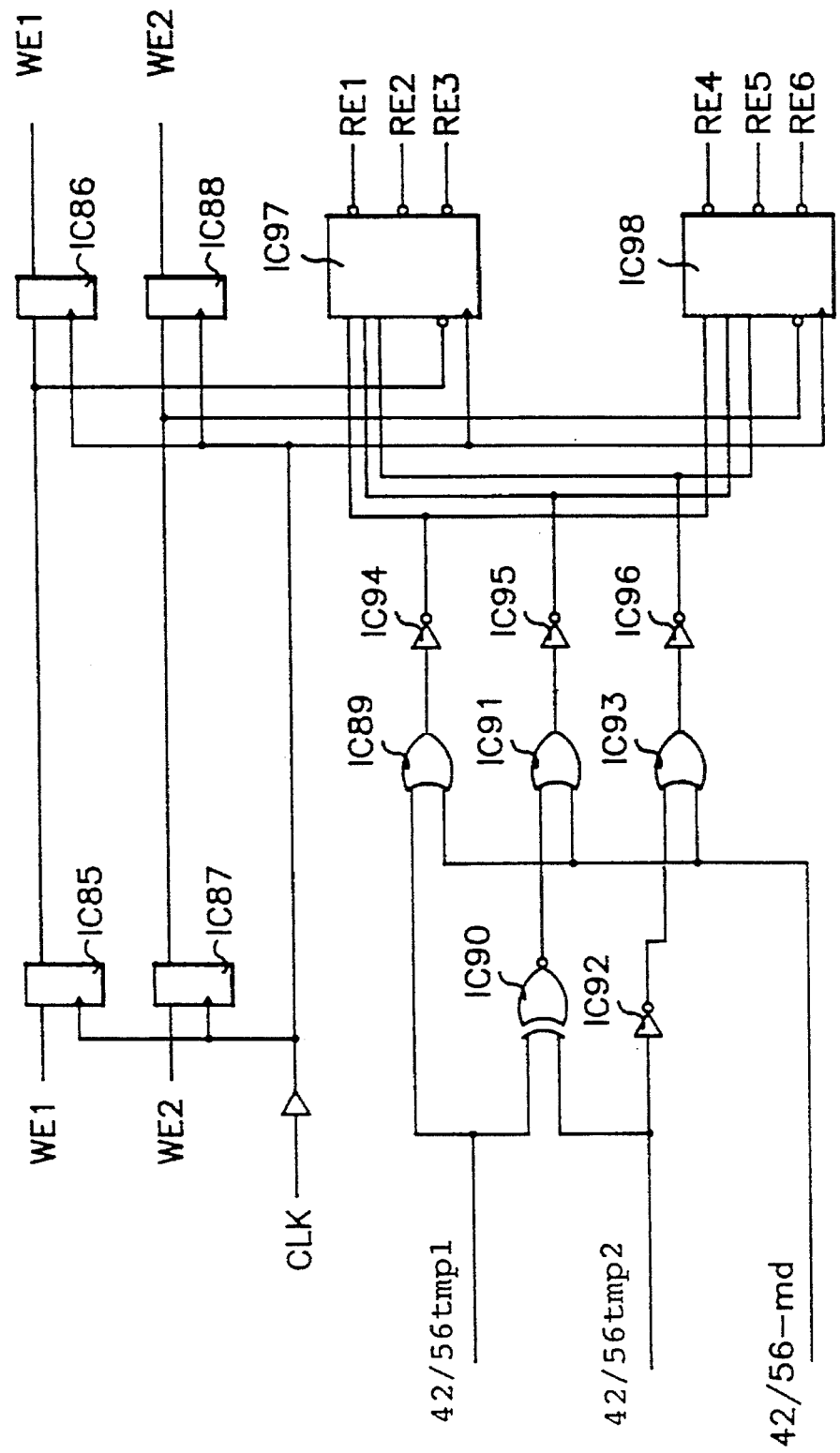
FIG. 16 is a functional block diagram of a demultiplexer in the control signal generation section in FIG. 6 in accordance with the embodiment of the present invention.

Referring to FIG. 16, a functional block diagram of the demultiplexer 60*n* in the control signal generation section 60 in FIG. 6 is shown in accordance with the embodiment of the present invention. As shown in this drawing, the demultiplexer 60*n* comprises a first D flip-flop IC85 for inputting the first write enable signal WE1 from the write enable signal generation circuit 60*d* as its input signal and the read clock signal of the second or third frequency from the clock signal generation circuit 60*b* as its clock signal. A second D flip-flop IC86 inputs the read clock signal of the second or third frequency from the clock signal generation circuit 60*b* as its clock signal and an output signal from the first D flip-flop IC85 as its input signal and outputs the first write enable signal WE1 to the FiFo line memory section 50.

A third D flip-flop IC87 is provided in the demultiplexer 60*n* to input the second write enable signal WE2 from the write enable signal generation circuit 60*d* as its input signal and the read clock signal of the second or third frequency from the clock signal generation circuit 60*b* as its clock signal.

A fourth D flip-flop IC88 is provided in the demultiplexer 60*n* to input an output signal from the third D flip-flop IC87 as its input signal and the read clock signal of the second or third frequency from the clock signal generation circuit 60*b* as its clock signal and output the second write enable signal WE2 to the FiFo line memory section 50.

The demultiplexer 60*n* also comprises a first OR gate IC89 for inputting the first and second intermediate signals or the fourth and fifth intermediate signals from the multiplexer 60*m*, and an exclusive-NOR gate IC90 for inputting the second and third intermediate signals or the fifth and sixth intermediate signals from the multiplexer 60*m*, a second OR gate IC91 inputs an output signal from the exclusive-NOR gate IC90 and the first intermediate signal or the fourth intermediate signal from the multiplexer 60*m*, and a first inverter gate IC92 inverts the third intermediate signal or the sixth intermediate signal from the multiplexer 60*m*. A third OR gate IC93 inputs an output signal from the first inverter gate IC92 and the first intermediate signal or the fourth intermediate signal from the multiplexer 60*m*, and a second inverter gate IC94 inverts an output signal from the first OR gate IC89. A third inverter gate IC95 inverts an output signal from the second OR gate IC91, and a fourth inverter gate IC96 for inverting an output signal from the third OR gate IC93.

A first register IC97 is adapted to input the output signal from the first D flip-flop IC85 as its enable or disable signal, the read clock signal of the second or third frequency from the clock signal generation circuit 60*b* as its clock signal and output signals from the second to fourth inverter gates IC94–IC96 as its input signal. The first register IC97 sequentially outputs the first to third read enable signals RE1–RE3 at the initial one horizontal line 1H of the NTSC video signal.

A second register IC98 is adapted to input the output signal from the third D flip-flop IC87 as its enable or disable signal, the read clock signal of the second or third frequency from the clock signal generation circuit 60*b* as its clock signal and the output signals from the second to fourth inverter gates IC94–IC96 as its input signals. The second register IC98 sequentially output the fourth to sixth read enable signals RE4–RE6 at the next one horizontal line 1H of the NTSC video signal.

As mentioned above, the first and second horizontal synchronizing signal generation circuits 60*e* and 60*i* are substantially of the same construction, with the exception that the counters thereof have different initial values. Also, the first and fourth intermediate signal generation circuits 60*f* and 60*j* are substantially of the same construction, with the exception that the counters thereof have different initial values. Similarly, the second and third intermediate signal generation circuits 60*g* and 60*h* are substantially of the same construction, with the exception that the counters thereof have different initial values. Similarly, the fifth and sixth intermediate signal generation circuits 60*k* and 60*l* are substantially of the same construction, with the exception that the counters thereof have different initial values.

Figure 17:
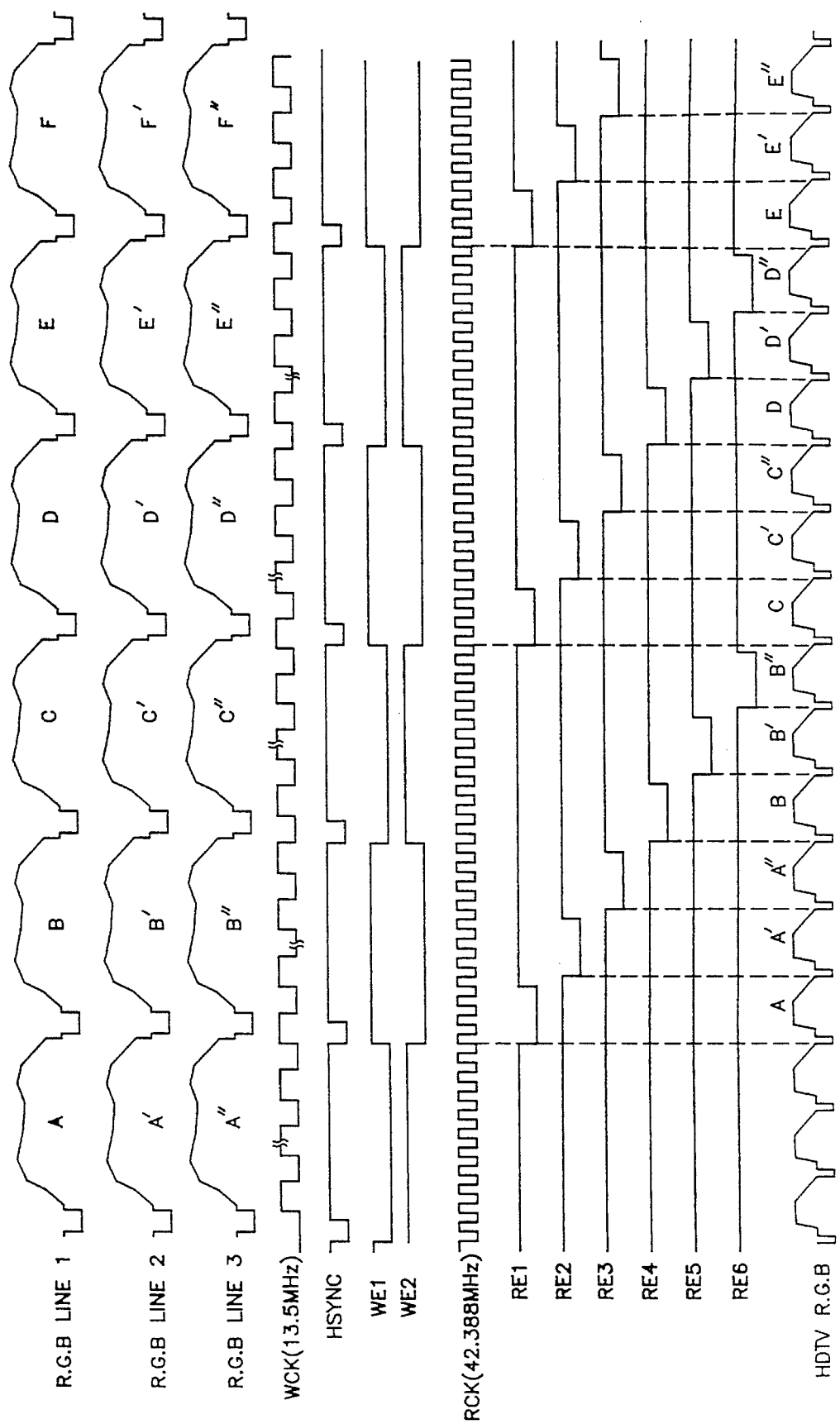
FIG. 17 is a timing diagram of signals from components in the FiFo line memory section in FIG. 5 and in the control signal generation section in FIG. 6 upon generation of a read clock signal of a second frequency.

FIG. 17 is a timing diagram of the signals from the components in FIGS. 3, 5 and 6 when the read clock signal of the second frequency of 42.388 MHz is generated from the clock signal generation circuit 60*b* in response to the first mode select signal MS1 from the mode select signal generation circuit 60*a*. In this drawing, the reference numerals R.G.B. LINE-1 to R.G.B. LINE-3 designate tripled, three lines of the NTSC video signal which are obtained by writing one line of the NTSC video signal into three of the FiFo line memories, respectively. The reference numeral WCK designates the write clock signal of the first frequency of 13.5 MHz generated from the clock signal generation circuit 60*b*. The reference label Hsync designates the NTSC horizontal synchronizing signal detected by the horizontal synchronizing signal detection circuit 60*c*. The reference labels WE1 and WE2 designate the first and second write enable signals generated from the write enable signal generation circuit 60*d*, respectively. The reference label RCK designates the read clock signal of the second frequency of 42.388 MHz generated from the clock signal generation circuit 60*b*. The reference labels RE1–RE6 designate the first to sixth read enable signals which are outputted from the demultiplexer 60*n* in the unit of two horizontal lines 2H of the NTSC video signal, respectively. The reference label HDTV R.G.B. designates a state in which the tripled, three lines of the NTSC video signal stored in three of the FiFo line memories are sequentially read in response to the corresponding three read enable signals.

Figure 18:
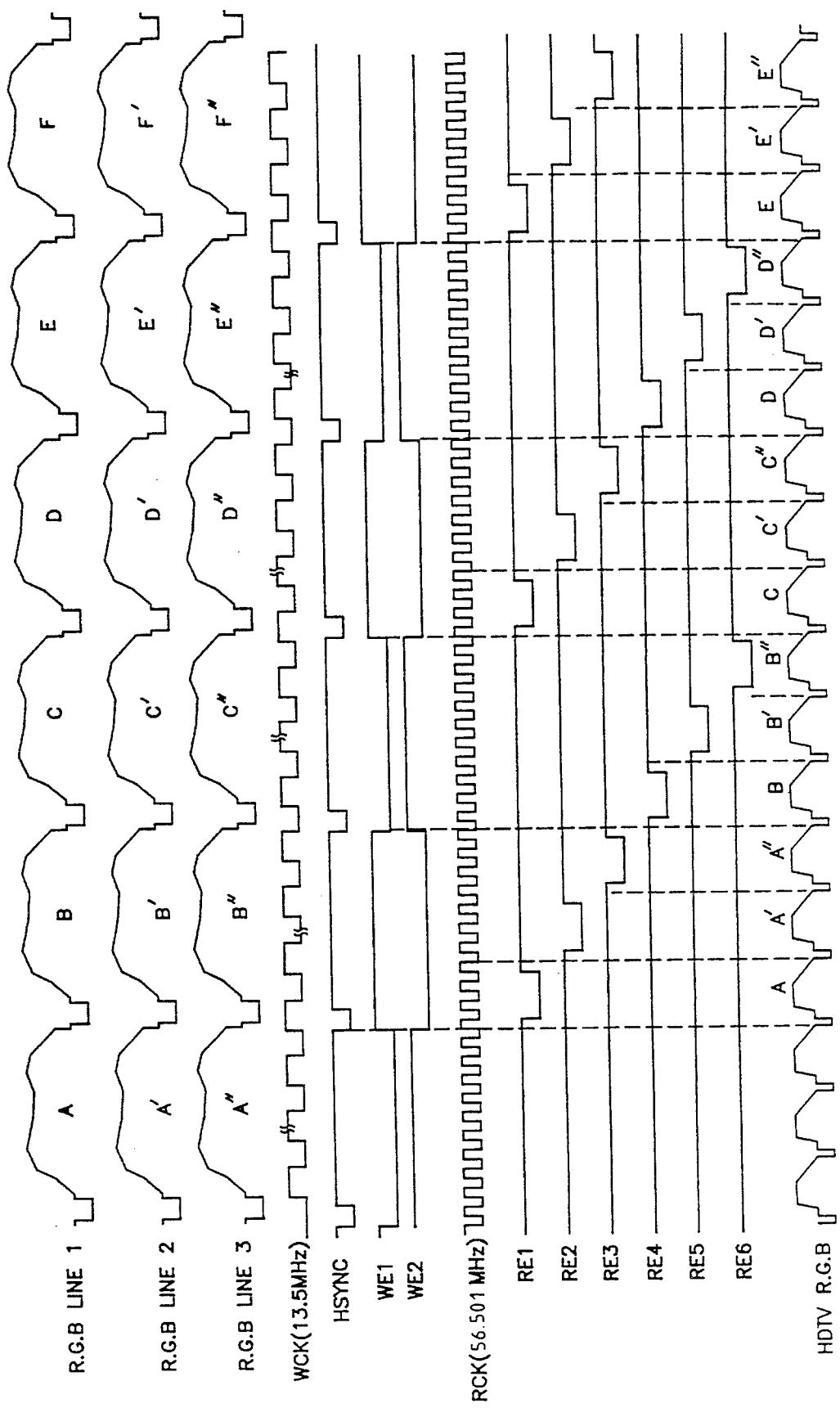
FIG. 18 is a timing diagram of the signals from the components in the FiFo line memory section in FIG. 5 and in the control signal generation section in FIG. 6 upon generation of a read clock signal of a third frequency.

FIG. 18 is a timing diagram of the signals from the components in FIGS. 3, 5 and 6 when the read clock signal of the third frequency of 56.501 MHz is generated from the clock signal generation circuit 60*b* in response to the second mode select signal MS2 from the mode select signal generation circuit 60*a*. The reference labels in this drawing are the same as those in FIG. 17, with exception that the reference label RCK designates the read clock signal of the third frequency of 56.501 MHz generated from the clock signal generation circuit 60*b*, and a description thereof will thus be omitted.

Figure 19:
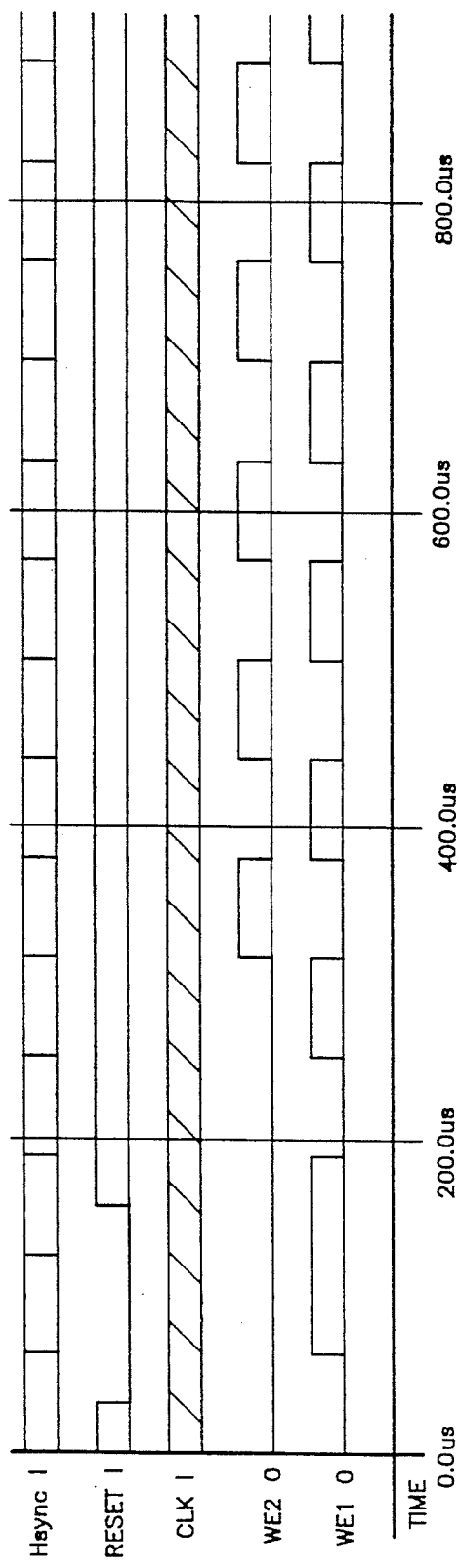
FIG. 19 is a timing diagram of signals from components in the write enable signal generation circuit in FIG. 7.

FIG. 19 is a timing diagram of the signals from the components in the write enable signal generation circuit 60*d* in. FIG. 7. In this drawing, the reference label Hsync I designates the NTSC horizontal synchronizing signal detected by the horizontal synchronizing signal detection circuit 60*c*. The reference label CLK I designates the clock signal of the second or third frequency generated from the clock signal generation circuit 60*b*. The reference label reset I designates the first reset signal generated from the first reset signal generation circuit 60*d*1.

Figure 20:
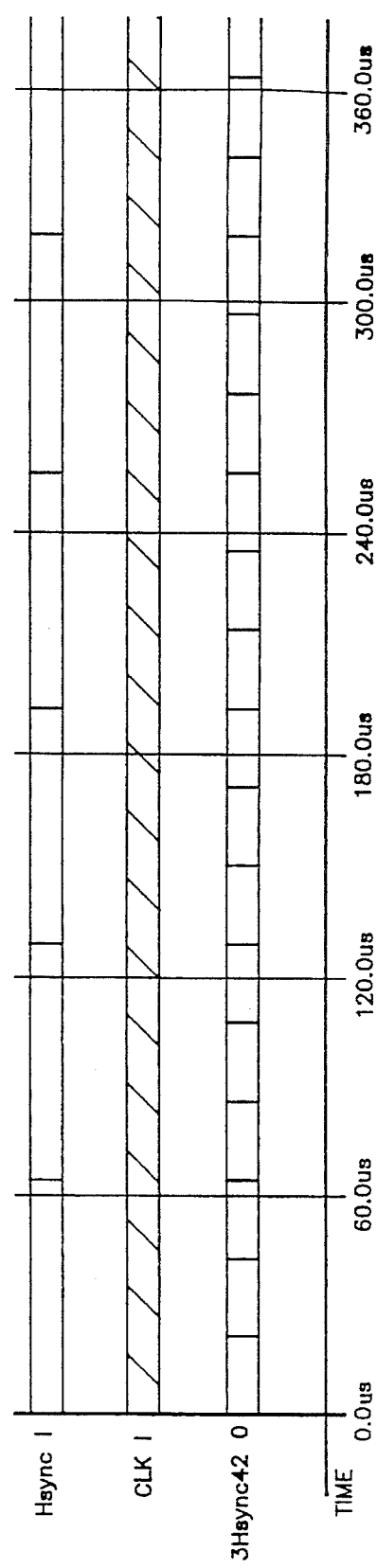
FIG. 20 is a timing diagram of signals from components in the first horizontal synchronizing signal generation circuit in FIG. 8.

FIG. 20 is a timing diagram of the signals from the components in the first horizontal synchronizing signal generation circuit 60*e* in FIG. 8. In this drawing, the reference numeral 3Hsync42 designates the three horizontal synchronizing signals which are generated from the first horizontal synchronizing signal generation circuit 60*e* in response to the read clock signal of the second frequency every one horizontal line of the NTSC video signal. The reference labels Hsync I and CLK I in this figure are the same as those in FIG. 19 and a description thereof will thus be omitted.

Figure 21:
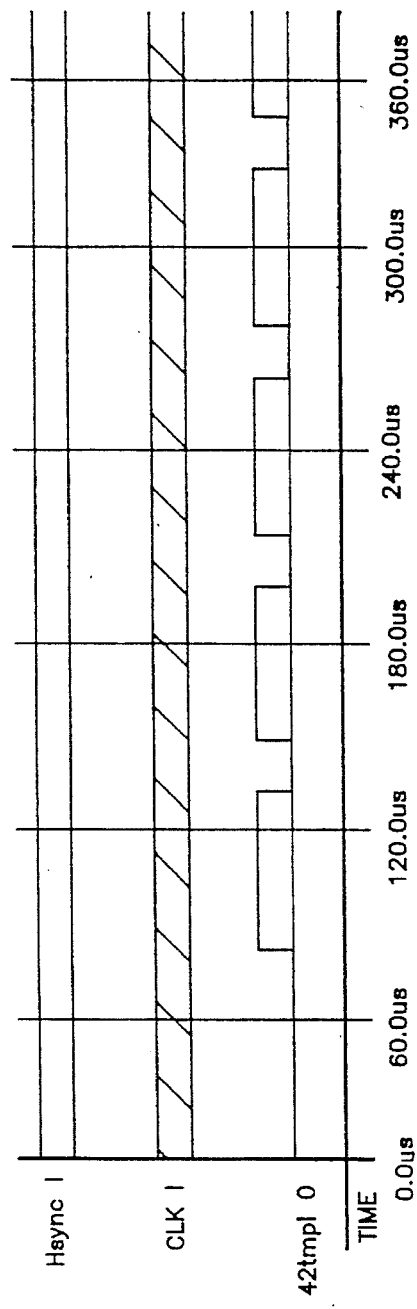
FIG. 21 is a timing diagram of signals from components in the second intermediate signal generation circuit in FIG. 9.

FIG. 21 is a timing diagram of the signals from the components in the second intermediate signal generation circuit 60*g* in FIG. 9. In this drawing, the reference label 42tmp1 designates the second intermediate signal which is generated from the second intermediate signal generation circuit 60*g* every one horizontal line of the NTSC video signal except the first one. The reference labels Hsync I and CLK I in this figure are the same as those in FIG. 19 and a description thereof will thus be omitted.

Figure 22:
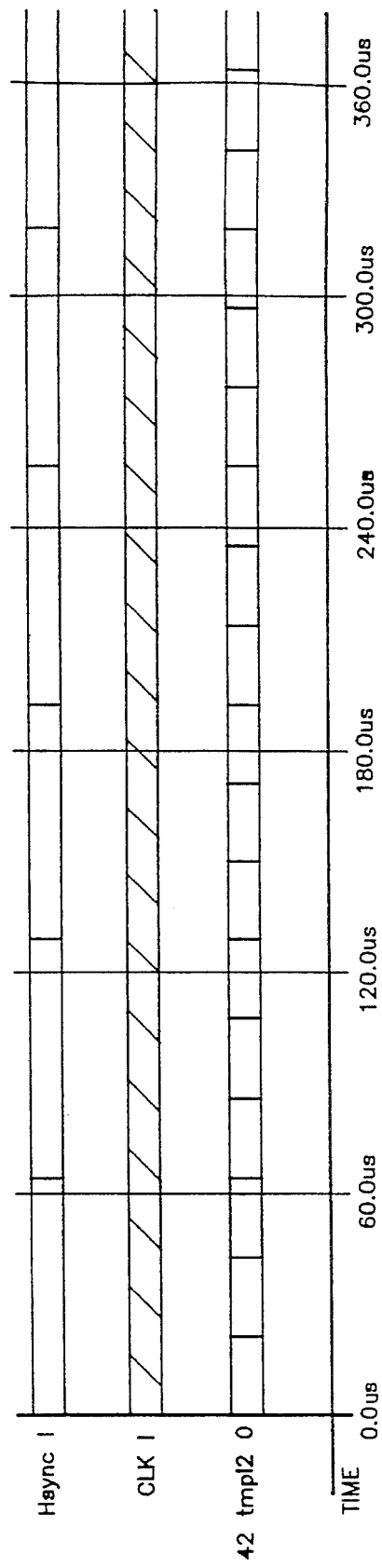
FIG. 22 is a timing diagram of signals from components in the third intermediate signal generation circuit in FIG. 10.

FIG. 22 is a timing diagram of the signals from the components in the third intermediate signal generation circuit 60*h* in FIG. 10. In this drawing, the reference label 42tmp2 designates the third intermediate signal which is generated from the third intermediate signal generation circuit 60*h* every one horizontal line of the NTSC video signal except the first one. The reference labels Hsync I and CLK I in this figure are the same as those in FIG. 19 and a description thereof will thus be omitted.

Figure 23:
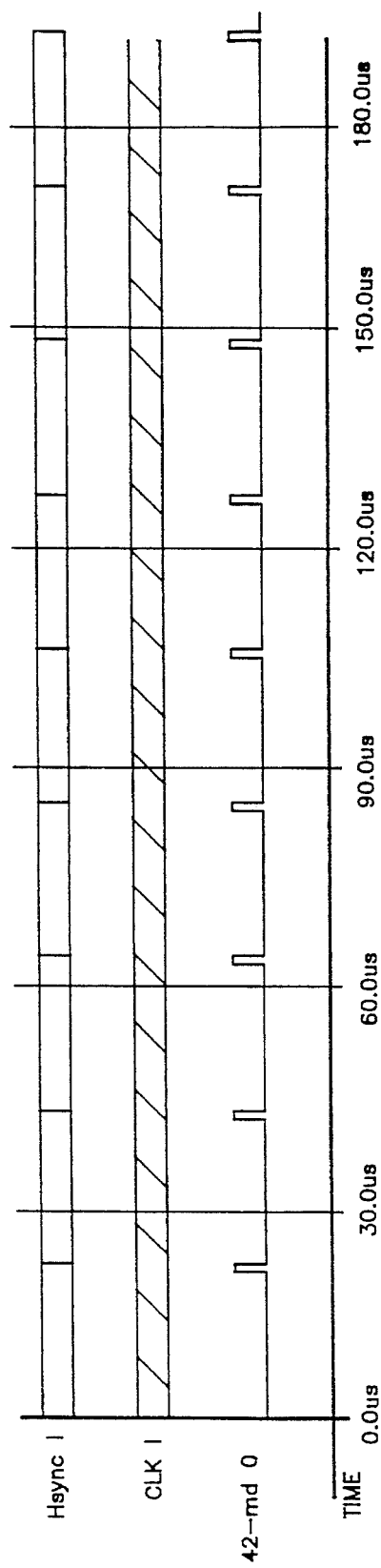
FIG. 23 is a timing diagram of signals from components in the first intermediate signal generation circuit in FIG. 11.

FIG. 23 is a timing diagram of the signals from the components in the first intermediate signal generation circuit 60*f* in FIG. 11. In this drawing, the reference label 42-md designates the first intermediate signal which is generated from the first intermediate signal generation circuit 60*f* whenever the three horizontal synchronizing signals 3Hsync42 are generated from the first horizontal synchronizing signal generation circuit 60*e*. The reference labels Hsync I and CLK I in this figure are the same as those in FIG. 19 and a description thereof will thus be omitted.

Figure 24:
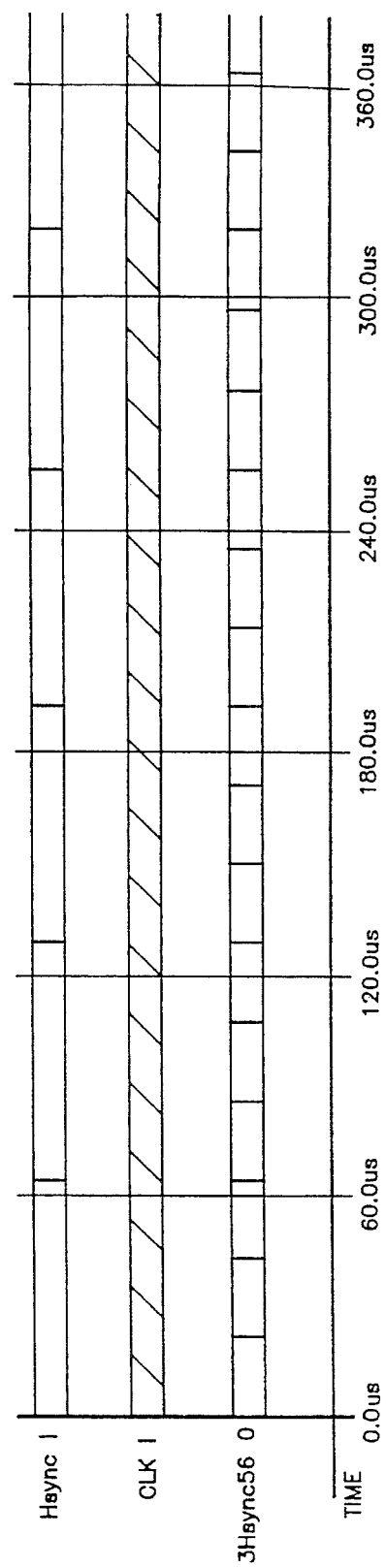
FIG. 24 is a timing diagram of signals from components in the second horizontal synchronizing signal generation circuit in FIG. 12.

FIG. 24 is a timing diagram of the signals from the components in the second horizontal synchronizing signal generation circuit 60*i* in FIG. 12. In this figure, the reference label 3Hsync56 designates the three horizontal synchronizing signals which are generated from the second horizontal synchronizing signal generation circuit 60*i* in response to the read clock signal of the third frequency every one horizontal line of the NTSC video signal. The reference labels Hsync I and CLK I in this figure are the same as those in FIG. 19 and a description thereof will thus be omitted.

Figure 25:
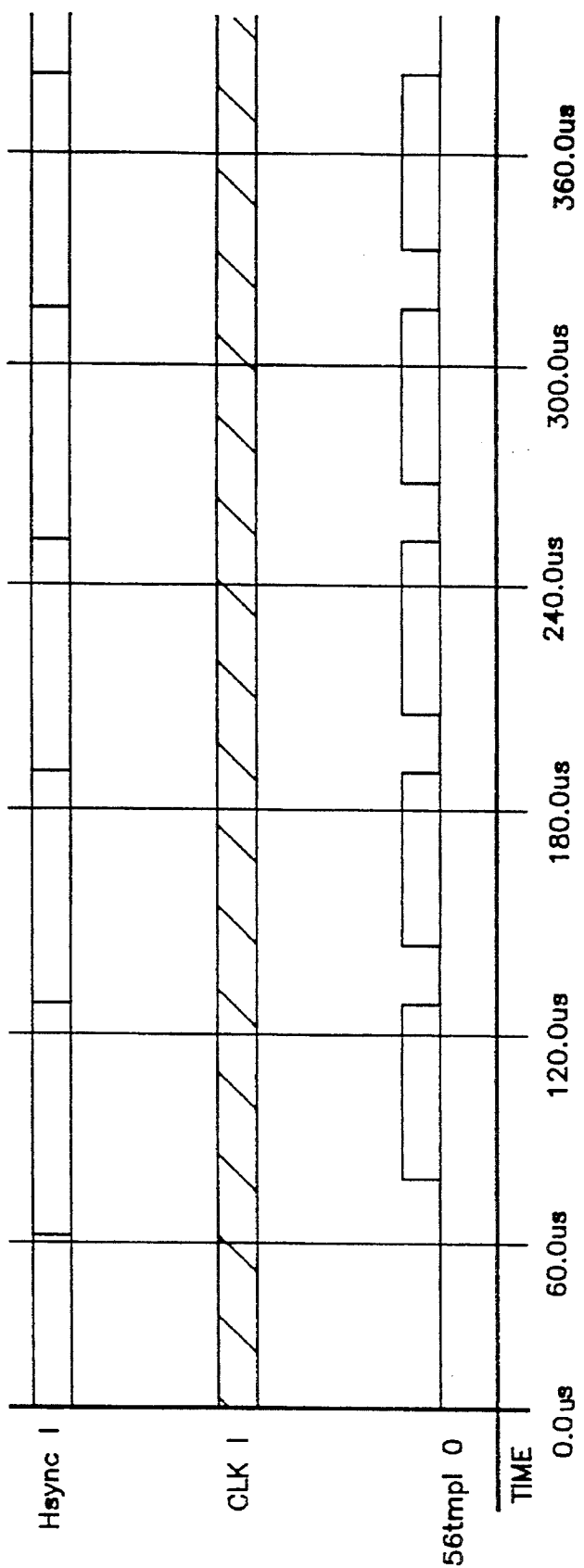
FIG. 25 is a timing diagram of signals from components in the fifth intermediate signal generation circuit in FIG. 13.

FIG. 25 is a timing diagram of the signals from the components in the fifth intermediate signal generation circuit 60*k* in FIG. 13. In this drawing, the reference label 56tmp1 designates the fifth intermediate signal which is generated from the fifth intermediate signal generation circuit 60*k* every one horizontal line of the NTSC video signal except the first one. The reference labels Hsync I and CLK I in this figure are the same as those in FIG. 19 and a description thereof will thus be omitted.

Figure 26:
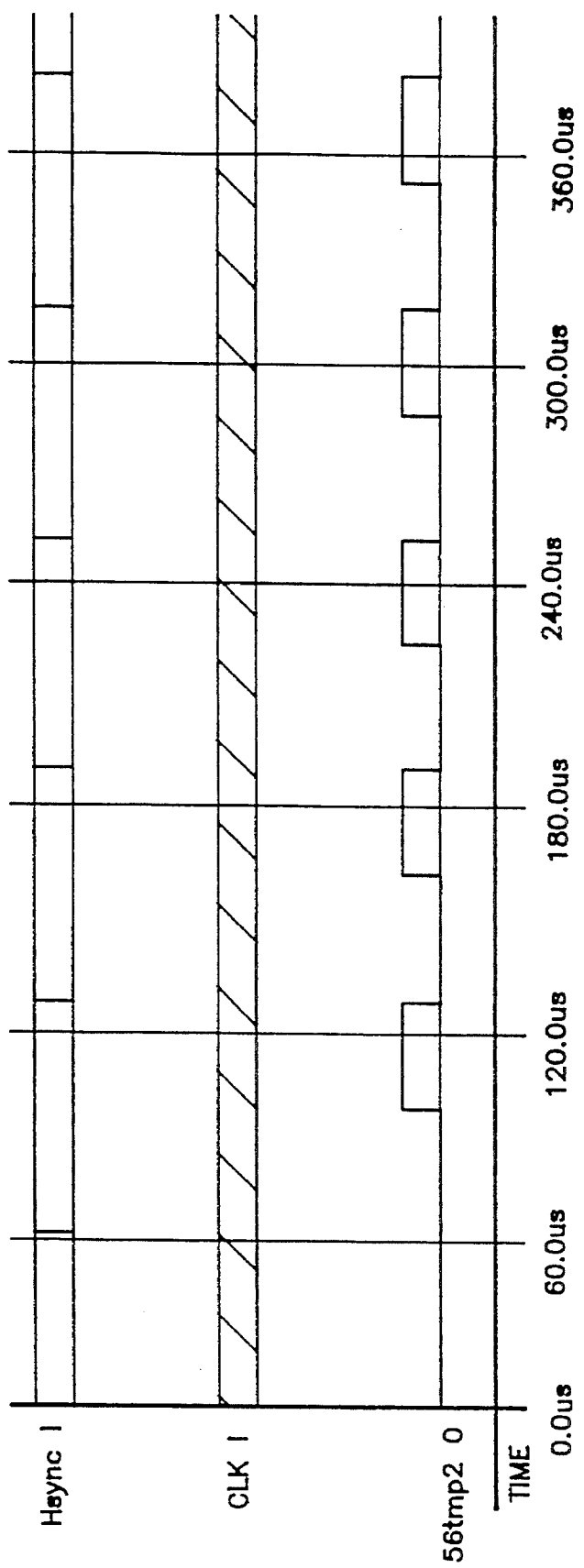
FIG. 26 is a timing diagram of signals from components in the sixth intermediate signal generation circuit in FIG. 14.

FIG. 26 is a timing diagram of the signals from the components in the sixth intermediate signal generation circuit 60*l* in FIG. 14. In this drawing, the reference label 56tmp2 designates the sixth intermediate signal which is generated from the sixth intermediate signal generation circuit 60*l* every one horizontal line of the NTSC video signal except the first one. The reference labels Hsync I and CLK I in this figure are the same as those in FIG. 19 and a description thereof will thus be omitted.

Figure 27:
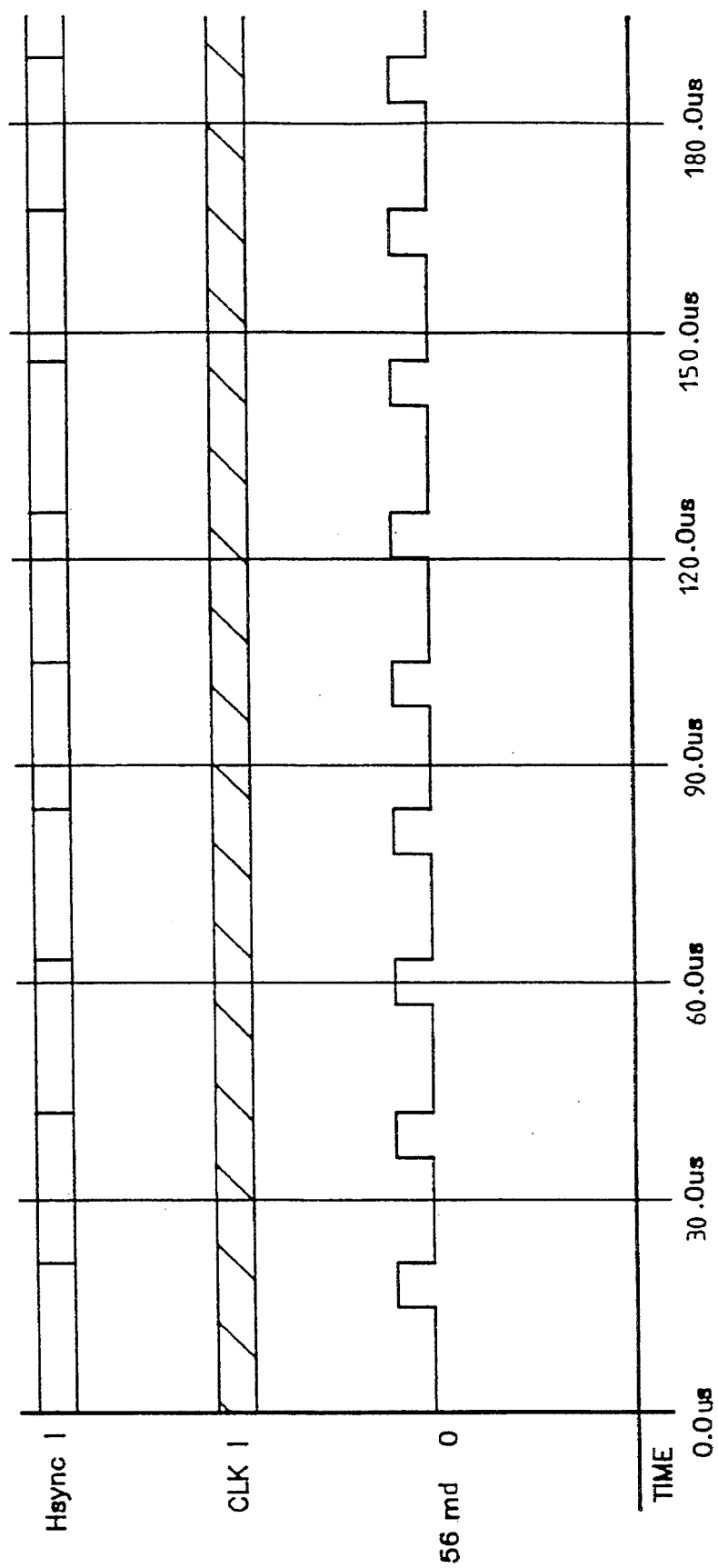
FIG. 27 is a timing diagram of signals from components in the fourth intermediate signal generation circuit in FIG. 15.

FIG. 27 is a timing diagram of the signals from the components in the fourth intermediate signal generation circuit 60*j* in FIG. 15. In this drawing, the reference label 56-md designates the fourth intermediate signal which is generated from the fourth intermediate signal generation circuit 60*j* whenever the three horizontal synchronizing signals 3Hsync56 are generated from the second horizontal synchronizing signal generation circuit 60*i*. The reference labels Hsync I and CLK I in this figure are the same as those in FIG. 19 and a description thereof will thus be omitted.

Figure 28:
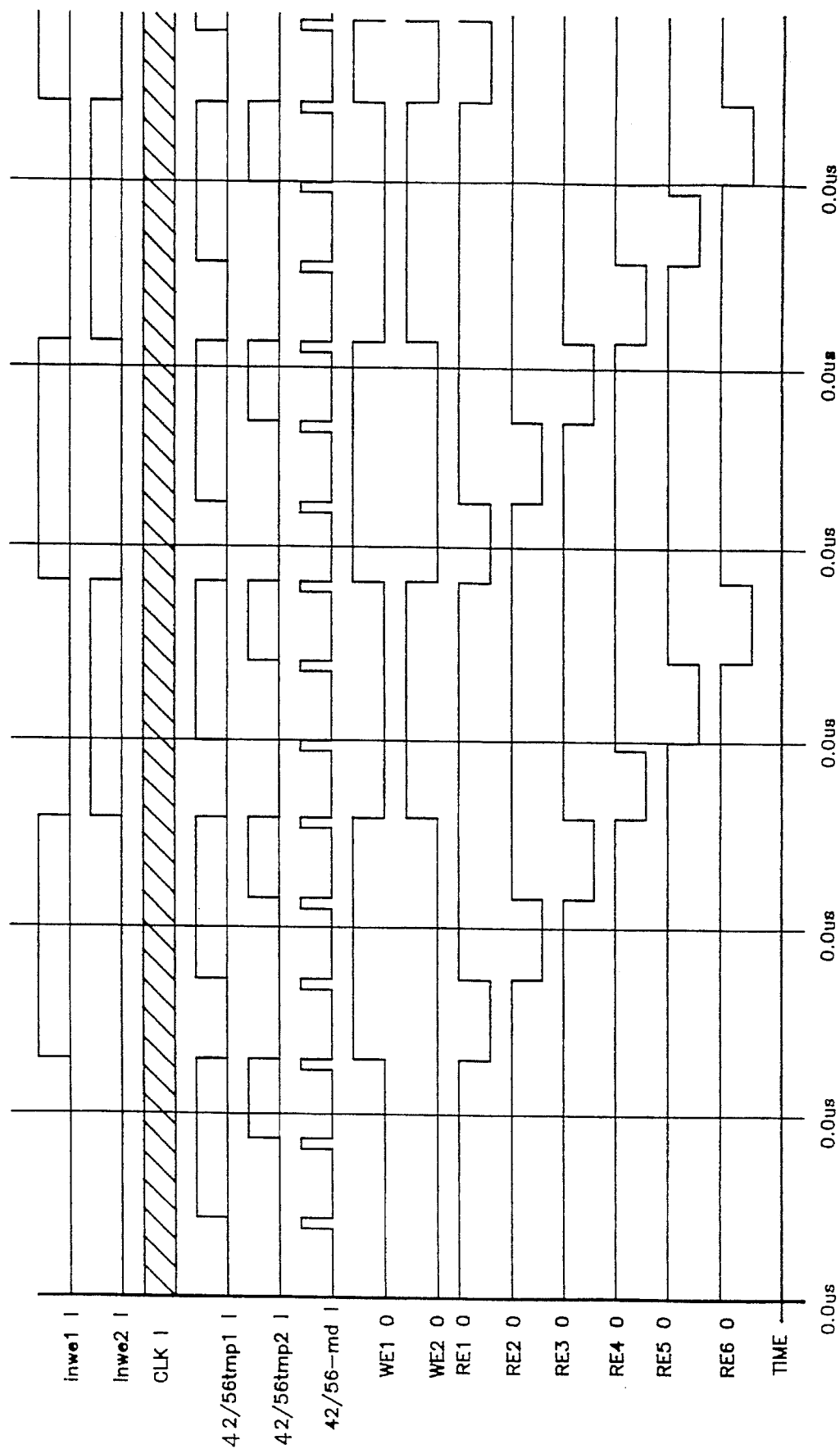
FIG. 28 is a timing diagram of signals from components in the demultiplexer in FIG. 16.

FIG. 28 is a timing diagram of the signals from the components in the demultiplexer 60*n* in FIG. 16. In this drawing, the reference labels inwe1 and inwe2 designate the first and second write enable signals generated from the write enable signal generation circuit 60*d*, respectively. The reference numeral CLK I designates the read clock signal of the second or third frequency generated from the clock signal generation circuit 60*b*. The reference label 42/56tmp1 I designates the second intermediate signal or the fifth intermediate signal. The reference label 42/56tmp2 I designates the third intermediate signal or the sixth intermediate signal. The reference label 42/56-md I designates the first intermediate signal or the fourth intermediate signal. The reference labels WE1 and WE2 designate the first and second write enable signals which are applied from the demultiplexer 60n to the FiFo line memory section 50, respectively. The reference labels RE1–RE6 designate the first to sixth read enable signals which are outputted from the demultiplexer 60n in the unit of two horizontal lines 2H of the NTSC video signal, respectively.

Now, the operation of the line tripler with the above-mentioned construction in accordance with the present invention will be described in detail with reference to FIGS. 3 to 28.

As shown in FIG. 3, the received NTSC R, G and B video data is corrected from its non-linear state into the linear state by the camera gamma correction circuit 40. The linear NTSC video data from the camera gamma correction circuit 40 is applied to the FiFo line memory section 50 in line units as shown in FIG. 5.

First, one line of the NTSC video data is written, being tripled, into the first to third FiFo line memories 50b–50d in the FiFo line memory section 50 by the first write enable signal WE1 and a three times-repeated writing algorithm. Then, while the next one line of the NTSC video data is written, being tripled, into the fourth to sixth FiFo line memories 50e–50g in the FiFo line memory section 50 by the second write enable signal WE2 and the three times-repeated writing algorithm, the just previously tripled, three lines of the NTSC video data are sequentially read from the first to third FiFo line memories 50b–50d by a three times-repeated reading algorithm and the first to third read enable signals RE1–RE3. This process is referred to as line tripling.

In the writing operation, the clock signal has the first frequency of 13.5 MHz.

In order to convert the format of the NTSC video data into one of the two HDTV formats, the mode select signal generation circuit 60a in FIG. 6 generates one of the first and second mode select signals MS1 and MS2 according to the user's selection.

In the case where the NTSC video data is to be converted into the HDTV format of the 16:9 aspect ratio, the first mode select signal MS1 is generated from the mode select signal generation circuit 60a. In response to the first mode select signal MS1, the clock signal generation circuit 60b generates the read clock signal of the second frequency of 42.388 MHz and the control signal generation section 60 generates the first to sixth read enable signals RE1–RE6 at the sampling rate of the second frequency.

The first to sixth read enable signals RE1–RE6 are sequentially generated in the unit of two horizontal lines 2H of the NTSC video data. Hence, the repeated lines of the NTSC video data stored in the order of A, A' and A" of FIG. 17 in the first to third FiFo line memories 50b–50d in the FiFo line memory section 50 are sequentially read by the first to third read enable signals RE1–RE3. Also, the next repeated lines of the NTSC video data stored in the order of B, B' and B" of FIG. 17 in the fourth to sixth FiFo line memories 50e–50g are sequentially read by the fourth to sixth read enable signals RE4–RE6.

In the case where the NTSC video data is to be converted into the HDTV format of the 4:3 aspect ratio, the second mode select signal MS2 is generated from the mode select signal generation circuit 60a. In response to the second mode select signal MS2, the clock signal generation circuit 60b generates the read clock signal of the third frequency of 56.501 MHz and the control signal generation section 60 generates the first to sixth read enable signals RE1–RE6 at the sampling rate of the third frequency. The subsequent procedure is the same as that in the case of the HDTV format of the 16:9 aspect ratio and a description thereof will thus be omitted.

The first and second write enable signals WE1 and WE2 and the first to sixth read enable signals RE1–RE6 may be active low or high.

In this manner, the NTSC video data can have the HDTV format as one line thereof is tripled into three lines. The line tripling allows the format of the NTSC video data to be converted into the HDTV format in the vertical direction of the screen.

The conversion of the format of the NTSC video data into the HDTV format in the horizontal direction of the screen is made possible by adjusting the sampling rate or the frequency of the clock signal in reading the tripled lines of the NTSC video data stored in the FiFo line memory section 50. Namely, in the case where the clock signal generation circuit 60b generates the read clock signal of the second frequency of 42 MHz in response to the first mode select signal MS1 from the mode select signal generation circuit 60a, the three lines of the .NTSC video data stored in the first to third FiFo line memories 50b–50d or the fourth to sixth FiFo line memories 50e–50g are sequentially read at the sampling rate of the second frequency. As a result, the format of the NTSC video data is converted into the HDTV format of the 16:9 aspect ratio. On the contrary, in the case where the clock signal generation circuit 60b generates the read clock signal of the third frequency of 56 MHz in response to the second mode select signal MS2 from the mode select signal generation circuit 60a, the three lines of the NTSC video data stored in the first to third FiFo line memories 50b–50d or the fourth to sixth FiFo line memories 50e–50g are sequentially read at the sampling rate of the third frequency. As a result, the format of the NTSC video data is converted into the HDTV format of the 4:3 aspect ratio.

In the write enable signal generation circuit 60d as shown in FIG. 7, the counter IC1 of the second reset signal generation circuit 60d2 inputs the NTSC horizontal synchronizing signal Hsync of 15.75 MHz from the horizontal synchronizing signal detection circuit 60c as a sampling clock signal. In the second reset signal generation circuit 60d2, the output signal from the counter IC1 is applied directly to the AND gate IC5 and also through the first and second D flip-flops IC2 and IC3 and the first inverter gate IC4 to the AND gate IC5. As a result of ANDing the inputted signals, the AND gate IC5 outputs a signal 1/2Hsync having half of a period of the NTSC horizontal synchronizing signal Hsync. In result, the second reset signal generation circuit 60d2 outputs the second reset signal to the first counting circuit 60d3 at a period of the signal 1/2Hsync.

In the first counting circuit 60d3, the first to third counters IC11–IC13 input the second reset signal from the second reset signal generation circuit 60d2 as their reset signals and count the write clock signal of the first frequency of 13.5 MHz from the clock signal generation circuit 60b by 858 from CA5H to FFFH. Upon counting the write clock signal by 858, the third counter IC13 outputs a high signal to the D flip-flop IC14, thereby causing the D flip-flop IC14 to output the first write enable signal WE1 as shown in FIG. 19. The high signal from the third counter IC13 is also applied to the logic operation unit 60d5.

In the logic operation unit 60d5, the inverter gate IC24 inverts the high signal from the third counter IC13 and outputs the resultant low signal to the AND gate IC25, which is also applied with the output signal from the second counting circuit 60*d*4. As a result of ANDing the inputted signals, the AND gate IC25 outputs the second write enable signal WE2 through the D flip-flop IC26.

Upon receiving the first reset signal (reset I) from the first reset signal generation circuit 60*d*1 as shown in FIG. 19, the second counting circuit 60*d*4 outputs a low signal until it counts the NTSC horizontal synchronizing signal Hsync from the horizontal synchronizing signal detection circuit 60*c* by the predetermined number. Subsequently, as shown in FIG. 19, the second write enable signal WE2 from the logic operation unit 60*d*5 goes low when the output signal from the second counting circuit 60*d*4 is low, while it has the opposite level to that of the first write enable signal WE1 when the output signal from the second counting circuit 60*d*4 is high.

Therefore, when the initial one line of the NTSC video data is written, being tripled, into the first to third FiFo line memories 50*b*–50*d* by the first write enable signal WE1, the second write enable signal WE2 is low. The second write enable signal WE2 remains at its low state until the three lines of the NTSC video data stored in the first to third FiFo line-memories 50*b*–50*d* begin to be read by the first to third read enable signals RE1–RE3.

On the other hand, the first and second horizontal synchronizing signal generation circuits 60*e* and 60*i* in FIGS. 8 and 12 are adapted to output the three horizontal synchronizing signals 3Hsync every one horizontal line 1H of the NTSC video data, respectively, by stretching the period of the NTSC horizontal synchronizing signal Hsync from the horizontal synchronizing signal detection circuit 60*c* by three times. Upon generation of the read clock signal of the second frequency of 42 MHz from the clock signal generation circuit 60*b*, only the first horizontal synchronizing signal generation circuit 60*e* generates the three horizontal synchronizing signals 3Hsync since the first and second horizontal synchronizing signal generation circuits 60*e* and 60*i* have different counter initial values. On the contrary, upon generation of the read clock signal of the third frequency of 56 MHz from the clock signal generation circuit 60*b*, only the second horizontal synchronizing signal generation circuit 60*i* generates the three horizontal synchronizing signals 3Hsync. FIGS. 20 and 24 show the NTSC horizontal synchronizing signal Hsync from the horizontal synchronizing signal detection circuit 60*c* and the output signals 3Hsync42 and 3Hsync56 from the first and second horizontal synchronizing signal generation circuits 60*e* and 60*i* depending on the read clock signal from the clock signal generation circuit 60*b*, respectively.

The first to sixth intermediate signal generation circuits 60*f*–60*h* and 60*j*–60*l* in FIG. 11, FIGS. 9 and 10, FIG. 15 and FIGS. 13 and 14 generate the first to sixth intermediate signals, respectively, for formation of the first to sixth read enable signals RE1–RE6. Three of the first to sixth intermediate signals from the first to sixth intermediate signal generation circuits 60*f*–60*h* and 60*j*–60*l* are selectively applied to the demultiplexer 60*n* through the multiplexer 60*m* in response to the output signal from the mode select signal generation circuit 60*a*. The demultiplexer 60*n* logically combines the inputted three signals to sequentially generate the first to sixth read enable signals RE1–RE6 in the unit of two horizontal lines 2H of the NTSC video data.

The first intermediate signal generation circuit 60*f* generates the first intermediate signal 42-md as shown in FIG. 23 in response to the three horizontal synchronizing signals 3Hsync from the first horizontal synchronizing signal generation circuit 60*e* and the read clock signal from the clock signal generation circuit 60*b*. The second and third intermediate signal generation circuits 60*g* and 60*h* generate the second and third intermediate signals 42tmp1 and 42tmp2 as shown in FIGS. 21 and 22, respectively, in response to the NTSC horizontal synchronizing signal Hsync from the horizontal synchronizing signal detection circuit 60*c* and the read clock signal from the clock signal generation circuit 60*b*.

The fourth intermediate signal generation circuit 60*j* generates the fourth intermediate signal 56-md as shown in FIG. 27 in response to the three horizontal synchronizing signals 3Hsync from the second horizontal synchronizing signal generation circuit 60*i* and the read clock signal from the clock signal generation circuit 60*b*. The fifth and sixth intermediate signal generation circuits 60*k* and 60*l* generate the fifth and sixth intermediate signals 56tmp1 and 56tmp2 as shown in FIGS. 25 and 26, respectively, in response to the NTSC horizontal synchronizing signal Hsync from the horizontal synchronizing signal detection circuit 60*c* and the read clock signal from the clock signal generation circuit 60*b*.

Noticeably, the first to third intermediate signal generation circuits 60*f*–60*h* generate normally the first to third intermediate signals 42-md, 42tmp1 and 42tmp2 upon receiving the read clock signal of the second frequency from the clock signal generation circuit 60*b*, whereas they are not normally operated upon receiving the read clock signal of the third frequency from the clock signal generation circuit 60*b*. On the contrary, the fourth to sixth intermediate signal generation circuits 60*j*–60*l* generate normally the fourth to sixth intermediate signals 56-md, 56tmp1 and 56tmp2 upon receiving the read clock signal of the third frequency from the clock signal generation circuit 60*b*, whereas they are not normally operated upon receiving the read clock signal of the second frequency from the clock signal generation circuit 60*b*.

The first intermediate signal generation circuit 60*f* functions in response to the three horizontal synchronizing signals 3Hsync42 from the first horizontal synchronizing signal generation circuit 60*e*, to increase the number of the samples of each of the lines of the NTSC video data stored in the first to sixth FiFo line memories 50*b*–50*g* to meet the HDTV format of the 16:9 aspect ratio. The number of the samples of each line of the NTSC video data is 858 in the horizontal direction of the screen, whereas the number of the samples of each line of the HDTV format of the 16:9 aspect ratio is 898 in the horizontal direction of the screen. In this connection, 40 samples must be added to the horizontal samples of each line of the NTSC video data to meet the HDTV format of the 16:9 aspect ratio. Therefore, the first intermediate signal generation circuit 60*f* acts to add the 40 samples to each of the lines of the NTSC video data outputted from the first to sixth FiFo line memories 50*b*–50*g* at an interval between adjacent ones of the first to sixth read enable signals RE1–RE6 as shown in FIG. 17.

The fourth intermediate signal generation circuit 60*j* functions in response to the three horizontal synchronizing signals 3Hsync56 from the second horizontal synchronizing signal generation circuit 60*i*, to increase the number of the samples of each of the lines of the NTSC video data stored in the first to sixth FiFo line memories 50*b*–50*g* to meet the HDTV format of the 4:3 aspect ratio. The number of the horizontal samples is 858 in each line of the NTSC video data, whereas it is 1197 in each line of the HDTV format of the 4:3 aspect ratio. In this connection, 339 samples must be added to the horizontal samples of each line of the NTSC video data to meet the HDTV format of the 4:3 aspect ratio. Therefore, the fourth intermediate signal generation circuit 60j acts to add the 339 samples to each of the lines of the NTSC video data outputted from the first to sixth FiFo line memories 50b–50g at an interval between adjacent ones of the first to sixth read enable signals RE1–RE6 as shown in FIG. 18.

In other words, each line of the NTSC video data is converted into the HDTV format of the 16:9 or 4:3 aspect ratio according to the sampling rate or the clock signal of the second or third frequency from the clock signal generation circuit 60b.

On the other hand, as shown in FIG. 16, in the demultiplexer 60n, the first to fourth D flip-flops IC85–IC88 delay the first and second write enable signals inwe1 and inwe2 from the write enable signal generation circuit 60d by the predetermined time and then output the resultant first and second write enable signals WE1 and WE2.

Also, the demultiplexer 60n logically combines the first to third intermediate signals 42-md, 42tmp1 and 42tmp2 or the fourth to sixth intermediate signals 56-md, 56tmp1 and 56tmp2 from the multiplexer 60m to sequentially generate the first to sixth read enable signals RE1–RE6 in the unit of two horizontal lines 2H of the NTSC video data. In this case, the first register IC97 inputs the first write enable signal WE1 as its enable or disable signal and the second register IC98 inputs the second write enable signal WE2 as its enable or disable signal. As a result, as shown in FIG. 28, the demultiplexer 60n generates the first to third read enable signals RE1–RE3 when the first write enable signal WE1 is active high and the fourth to sixth read enable signals RE4–RE6 when the second write enable signal WE2 is active high. As mentioned above, the first to third read enable signals RE1–RE3 allow the three lines of the NTSC video data stored in the first to third FiFo line memories 50b–50d to be sequentially read at one horizontal line 1H of the NTSC video data and the fourth to sixth read enable signals RE4–RE6 allows the three lines of the NTSC video data stored in the fourth to sixth FiFo line memories 50e–50g to be sequentially read at the next one horizontal line 1H of the NTSC video data.

As apparent from the above description, according to the present invention, each line of the NTSC video data is stored and tripled into three lines. The increase in the number of samples of each line of the NTSC video data is made possible by adjusting the sampling rate or the frequency of the clock signal in reading the stored three lines of the NTSC video data. Therefore, the format of the NTSC signal can be converted into the HDTV format of the desired screen aspect ratio.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A line tripler for an NTSC/HDTV dual receiver comprising:

control signal generation means for generating a plurality of write enable signals and a plurality of read enable signals, a write clock signal and a plurality of read clock signals; and memory means for storing each line of an NTSC video signal a plurality of times at a predetermined write sampling rate in response to the plurality of write enable signals from said control signal generation means to generate multiple lines and for sequentially outputting the stored multiple lines of the NTSC video signal at a predetermined read sampling rate in response to the plurality of read enable signals from said control signal generation means, the memory means including first latch means for temporarily storing the NTSC video signal in line units in response to the write clock signal of a first frequency;

first, second and third first-in-first-out (FIFO) line memories for storing lines of the NTSC video signal from said first latch means in response to the write clock signal of the first frequency and a transmitted first write enable signal, said first, second and third FIFO line memories sequentially outputting the stored lines of the NTSC video signal in response to the read clock signal of one of second and third frequencies and first, second and third read enable signals;

fourth, fifth and sixth FIFO line memories for storing next lines of the NTSC video signal from said first latch means in response to the write clock signal of the first frequency and a second write enable signal, said fourth, fifth and sixth FIFO line memories sequentially outputting the stored next lines of the NTSC video signal in response to the read clock signal of one of the second and third frequencies and a fourth, fifth and sixth read enable signals; and second latch means for temporarily storing three lines of the NTSC video signal from said first, second and third FIFO line memories or said fourth, fifth and sixth FIFO line memories in response to the read clock signal of one of the second and third frequencies.

2. A line tripler for an NTSC/HDTV dual receiver according to claim 1, wherein said control signal generation means comprises:

mode select signal generation means for generating one of a first mode select signal and a second mode select signal, said first mode select signal displaying the NTSC video signal at a 16:9 aspect ratio and said second mode select signal displaying the NTSC video signal at a 4:3 aspect ratio;

clock signal generation means for generating the write clock signal of the first frequency and the read clock signal of the second frequency in response to the first mode select signal from said mode select signal generation means or generating the write clock signal of the first frequency and the read clock signal of the third frequency in response to the second mode select signal from said mode select signal generation means;

horizontal synchronizing signal detection means for detecting an NTSC horizontal synchronizing signal from the NTSC video signal; and write enable signal generation means for alternately generating first and second write enable signals of opposite levels every one horizontal line of the NTSC video signal in response to the NTSC horizontal synchronizing signal from said horizontal synchronizing signal detection means and the write clock signal of the first frequency from said clock signal generation means.

3. A line tripler for an NTSC/HDTV dual receiver according to claim 2, wherein said control signal generation means comprises:

first horizontal synchronizing signal generation means for inputting the read clock signal from said clock signal generation means and the NTSC horizontal synchronizing signal from said horizontal synchronizing signal detection means and for generating three horizontal synchronizing signals in response to the read clock signal of the second frequency for each horizontal line of the NTSC video signal;

first intermediate signal generation means for inputting the read clock signal from said clock signal generation means and the three horizontal synchronizing signals from said first horizontal synchronizing signal generation means and for generating a first intermediate signal in response to the read clock signal of the second frequency at times when the three horizontal synchronizing signals from said first horizontal synchronizing signal generation means are applied;

second intermediate signal generation means for inputting the read clock signal from said clock signal generation means and the NTSC horizontal synchronizing signal from said horizontal synchronizing signal detection means and for generating a second intermediate signal in response to the read clock signal of the second frequency every one horizontal line of the NTSC video signal; and third intermediate signal generation means for inputting the read clock signal from said clock signal generation means and the NTSC horizontal synchronizing signal from said horizontal synchronizing signal detection means and for generating a third intermediate signal in response to the read clock signal of the second frequency every one horizontal line of the NTSC video signal.

4. A line tripler for an NTSC/HDTV dual receiver according to claim 3, wherein said control signal generation means comprises:

second horizontal synchronizing signal generation means for inputting the read clock signal from said clock signal generation means and the NTSC horizontal synchronizing signal from said horizontal synchronizing signal detection means and for generating three horizontal synchronizing signals in response to the read clock signal of the third frequency every one horizontal line of the NTSC video signal;

fourth intermediate signal generation means for inputting the read clock signal from said clock signal generation means and the three horizontal synchronizing signals from said second horizontal synchronizing signal generation means and for generating a fourth intermediate signal in response to the read clock signal of the third frequency at times when the three horizontal synchronizing signals from said second horizontal synchronizing signal generation means are applied;

fifth intermediate signal generation means for inputting the read clock signal from said clock signal generation means and the NTSC horizontal synchronizing signal from said horizontal synchronizing signal detection means and for generating a fifth intermediate signal in response to the read clock signal of the third frequency every one horizontal line of the NTSC video signal; and sixth intermediate signal generation means for inputting the read clock signal from said clock signal generation means and the NTSC horizontal synchronizing signal from said horizontal synchronizing signal detection means and for generating a sixth intermediate signal in response to the read clock signal of the third frequency every one horizontal line of the NTSC video signal.

5. A line tripler for an NTSC/HDTV dual receiver according to claim 4, wherein said control signal generation means comprises:

multiplexing means for inputting the first to sixth intermediate signals from said first to sixth intermediate signal generation means and outputting the first, second and third intermediate signals in response to the first mode select signal from said mode select signal generation means and the fourth, fifth and sixth intermediate signals in response to the second mode select signal from said mode select signal generation means; and demultiplexing means, responsive to the read clock signal of one of the second and third frequencies from said clock signal generation means, for transmitting the first and second write enable signals from said write enable signal generation means after a predetermined time delay and for logically combining the first, second and third intermediate signals or the fourth, fifth and sixth intermediate signals from said multiplexing means to sequentially generate first to sixth read enable signals in units of two horizontal lines of the NTSC video signal.

6. A line tripler for an NTSC/HDTV dual receiver according to claim 2, wherein said write enable signal generation means comprises:

first reset signal generation means for generating a first reset signal;

second reset signal generation means for generating a second reset signal in response to the NTSC horizontal synchronizing signal from said horizontal synchronizing signal detection means, the write clock signal of the first frequency from said clock signal generation means and the first reset signal from said first reset signal generation means;

first counting means for performing a counting operation in response to the write clock signal of the first frequency from said clock signal generation means and the second reset signal from said second reset signal generation means and outputting the first write enable signal in accordance with a first counted result;

second counting means for performing a counting operation in response to the NTSC horizontal synchronizing signal from said horizontal synchronizing signal detection means and the write clock signal of the first frequency from said clock signal generation means and outputting a logic signal in accordance with a second counted result, the logic signal having a first level at an initial horizontal line of the NTSC video signal and a second level at a next horizontal line of the NTSC video signal; and logic operation means for inputting the first write enable signal from said first counting means and the logic signal from said second counting means, outputting the logic signal from said second counting means as the second write enable signal when the logic signal from said second counting means has the first level and outputting a logic signal of an opposite level to that of the first write enable signal as the second write enable signal when the logic signal from said second counting means has the second level.

7. A line tripler for an NTSC/HDTV dual receiver according to claim 6, wherein said second reset signal generation means includes:

a counter for inputting the first reset signal from said first reset signal generation means and the NTSC horizontal synchronizing signal as a clock signal;

a first flip-flop for inputting an output signal from said counter as an input signal and the write clock signal of the first frequency as a clock signal;

a second flip-flop for inputting an output signal from said first flip-flop as an input signal and the write clock signal of the first frequency as a clock signal;

a first logic gate for inverting an output signal from said second flip-flop;

an AND gate for inputting the output signal from said counter and an output signal from said first logic gate;

a second logic gate for inverting an output signal from said AND gate;

a third flip-flop for inputting an output signal from said second logic gate as an input signal and the write clock signal of the first frequency as a clock signal;

a fourth flip-flop for inputting an output signal from said third flip-flop as an input signal and the write clock signal of the first frequency as a clock signal;

a third logic gate for inverting the output signal from said third flip-flop; and an NAND gate for inputting output signals from said third logic gate and said fourth flip-flop and outputting the second reset signal.

8. A line tripler for an NTSC/HDTV dual receiver according to claim 6, wherein said first counting means includes:

a first counter for inputting the second reset signal from said second reset signal generation means and the write clock signal of the first frequency as a clock signal and for counting a predetermined number in response to the inputted signals to generate a first carry signal;

a second counter for inputting the second reset signal from said second reset signal generation means and the write clock signal of the first frequency as a clock signal and for counting the first carry signal from said first counter by the predetermined number in response to the inputted signals to generate a second carry signal;

a third counter for inputting the second reset signal from said second reset signal generation means and the write clock signal of the first frequency as a clock signal and for counting the second carry signal from said second counter by the predetermined number in response to the inputted signals to output the first write enable signal;

a flip-flop for inputting the write clock signal of the first frequency as a clock signal and for outputting the first write enable signal from said third counter after a predetermined time delay; and a logic gate for inverting the first write enable signal from said third counter and for outputting the inverted signal as a control signal commonly to said first, second and third counters.

9. A line tripler for an NTSC/HDTV dual receiver according to claim 6, wherein said second counting means includes:

a first flip-flop for inputting the NTSC horizontal synchronizing signal as an input signal and the write clock signal of the first frequency as a clock signal;

a second flip-flop for inputting an output signal from said first flip-flop as an input signal and the write clock signal of the first frequency as a clock signal;

a third flip-flop for inputting an output signal from said second flip-flop as an input signal and the write clock signal of the first frequency as a clock signal;

a first counter for inputting the first reset signal from the first reset signal generation means and an output signal from said third flip-flop as a clock signal and for generating a plurality of output signals;

a second counter for inputting the first reset signal from the first reset signal generation means, the output signal from said third flip-flop as a clock signal and one output signal from said first counter as an input signal and for generating a second plurality of output signals;

an AND gate for inputting said one output signal from said first counter and one output signal from said second counter;

a third counter for inputting the first reset signal from said first reset signal generation means, the output signal from said third flip-flop as a clock signal and an output signal from said AND gate as an input signal; and an OR gate for inputting remaining output signals from said first counter, remaining output signals from said second counter and an output signal from said third counter and for outputting the logic signal having one of the first and second levels.

10. A line tripler for an NTSC/HDTV dual receiver according to claim 6, wherein said logic operation means includes:

a first logic gate for inverting the first write enable signal from said first counting means;

an AND gate for inputting the logic signal from said second counting means and an output signal from said first logic gate and for outputting the second write enable signal; and a flip-flop for inputting the write clock signal of the first frequency as a clock signal and for outputting the second write enable signal from said AND gate after a predetermined time delay.

11. A line tripler for an NTSC/HDTV dual receiver according to claim 3, wherein said first horizontal synchronizing signal generation means comprises:

reset signal generation means for generating a reset signal in response to the read clock signal of the second frequency from said clock signal generation means and the NTSC horizontal synchronizing signal from said horizontal synchronizing signal detection means; and counting means for performing a counting operation in response to the reset signal from said reset signal generation means and the read clock signal of the second frequency from said clock signal generation means and for outputting the three horizontal synchronizing signals in accordance with a counted result.

12. A line tripler for an NTSC/HDTV dual receiver according to claim 11, wherein said reset signal generation means includes:

a first flip-flop for inputting the NTSC horizontal synchronizing signal as an input signal and the read clock signal of the second frequency as a clock signal;

a second flip-flop for inputting an output signal from said first flip-flop as an input signal and the read clock signal of the second frequency as a clock signal;

a logic gate for inverting the output signal from said first flip-flop;

an AND gate for inputting output signals from said second flip-flop and said logic gate; and an NOR gate for inputting inverted ones of the three horizontal synchronizing signals from said counting means and an output signal from said AND gate and outputting the reset signal.

13. A line tripler for an NTSC/HDTV dual receiver according to claim 11, wherein said counting means includes:

a first counter for inputting the reset signal from said reset signal generation means and the read clock signal of the second frequency as a clock signal and for counting a predetermined number to generate a first carry signal;

a second counter for inputting the reset signal from said reset signal generation means, the read clock signal of the second frequency as a clock signal and the first carry signal from said first counter as a control signal and for counting the first carry signal from said first counter by the predetermined number to generate a second carry signal;

a third counter for inputting the reset signal from said reset signal generation means, the read clock signal of the second frequency as a clock signal and the second carry signal from said second counter as a control signal and for counting the second carry signal from said second counter by the predetermined number to output inverted ones of the three horizontal synchronizing signals; and a logic gate for inverting the output signals from said third counter to output the three horizontal synchronizing signals.

14. A line tripler for an NTSC/HDTV dual receiver according to claim 3, wherein said second intermediate signal generation means comprises:

reset signal generation means for generating a reset signal in response to the read clock signal of the second frequency from said clock signal generation means and the NTSC horizontal synchronizing signal from said horizontal synchronizing signal detection means; and counting means for performing a counting operation in response to the reset signal from said reset signal generation means and the read clock signal of the second frequency from said clock signal generation means and for outputting the second intermediate signal in accordance with a counted result.

15. A line tripler for an NTSC/HDTV dual receiver according to claim 14, wherein said reset signal generation means includes:

a first flip-flop for inputting the NTSC horizontal synchronizing signal as an input signal and the read clock signal of the second frequency as a clock signal;

a second flip-flop for inputting an output signal from said first flip-flop as an input signal and the read clock signal of the second frequency as a clock signal;

a logic gate for inverting the output signal from said first flip-flop; and an NAND gate for inputting output signals from said second flip-flop and said logic gate and for outputting the reset signal.

16. A line tripler for an NTSC/HDTV dual receiver according to claim 14, wherein said counting means includes:

a first counter for inputting the reset signal from said reset signal generation means and the read clock signal of the second frequency as a clock signal and for counting a predetermined number to generate a first carry signal;

a second counter for inputting the reset signal from said reset signal generation means and the read clock signal of the second frequency as a clock signal and for counting the first carry signal from said first counter by the predetermined number to generate a second carry signal;

a third counter for inputting the reset signal from said reset signal generation means and the read clock signal of the second frequency as a clock signal and for counting the second carry signal from said second counter by the predetermined number to output the second intermediate signal every one horizontal line of the NTSC video signal; and a logic gate for inverting the second intermediate signal from said third counter and outputting the inverted signal as a control signal commonly to said first, second and third counters.

17. A line tripler for an NTSC/HDTV dual receiver according to claim 3, wherein said third intermediate signal generation means comprises:

reset signal generation means for generating a reset signal in response to the read clock signal of the second frequency from said clock signal generation means and the NTSC horizontal synchronizing signal from said horizontal synchronizing signal detection means; and counting means for performing a counting operation in response to the reset signal from said reset signal generation means and the read clock signal of the second frequency from said clock signal generation means and for outputting the third intermediate signal in accordance with a counted result.

18. A line tripler for an NTSC/HDTV dual receiver according to claim 17, wherein said reset signal generation means includes:

a first flip-flop for inputting the NTSC horizontal synchronizing signal as an input signal and the read clock signal of the second frequency as a clock signal;

a second flip-flop for inputting an output signal from said first flip-flop as an input signal and the read clock signal of the second frequency as a clock signal;

a logic gate for inverting the output signal from said first flip-flop; and an NAND gate for inputting output signals from said second flip-flop and said logic gate and for outputting the reset signal.

19. A line tripler for an NTSC/HDTV dual receiver according to claim 17, wherein said counting means includes:

a first counter for inputting the reset signal from said reset signal generation means and the read clock signal of the second frequency as a clock signal and for counting a predetermined number to generate a first carry signal;

a second counter for inputting the reset signal from said reset signal generation means and the read clock signal of the second frequency as a clock signal and for counting the first carry signal from said first counter by the predetermined number to generate a second carry signal;

a third counter for inputting the reset signal from reset signal generation means and the read clock signal of the second frequency as a clock signal and for counting the second carry signal from said second counter by the predetermined number to output the third intermediate signal every one horizontal line of the NTSC video signal; and a logic gate for inverting the third intermediate signal from said third counter and for outputting the inverted signal as a control signal commonly to said first, second and third counters.

20. A line tripler for an NTSC/HDTV dual receiver according to claim 3, wherein said first intermediate signal generation means comprises:

a first counter for inputting the three horizontal synchronizing signals from said first horizontal synchronizing signal generation means as reset signals and the read clock signal of the second frequency from said clock signal generation means as a clock signal and for counting a predetermined number to generate a first carry signal;

a second counter for inputting the three horizontal synchronizing signals from said first horizontal synchronizing signal generation means as reset signals and the read clock signal of the second frequency from said clock signal generation means as a clock signal and for counting the first carry signal from said first counter by the predetermined number to generate a second carry signal;

a third counter for inputting the three horizontal synchronizing signals from said first horizontal synchronizing signal generation means as reset signals and the read clock signal of the second frequency from said clock signal generation means as a clock signal and for counting the second carry signal from said second counter by the predetermined number to output the first intermediate signal every one horizontal line of the NTSC video signal; and a logic gate for inverting the first intermediate signal from said third counter and for outputting the inverted signal as a control signal commonly to said first, second and third counters.

21. A line tripler for an NTSC/HDTV dual receiver according to claim 4, wherein said second horizontal synchronizing signal generation means comprises:

reset signal generation means for generating a reset signal in response to the read clock signal of the third frequency from said clock signal generation means and the NTSC horizontal synchronizing signal from said horizontal synchronizing signal detection means; and counting means for performing a counting operation in response to the reset signal from said reset signal generation means and the read clock signal of the third frequency from said clock signal generation means and for outputting the three horizontal synchronizing signals in accordance with a counted result.

22. A line tripler for an NTSC/HDTV dual receiver according to claim 21, wherein said reset signal generation means includes:

a first flip-flop for inputting the NTSC horizontal synchronizing signal as an input signal and the read clock signal of the third frequency as a clock signal;

a second flip-flop for inputting an output signal from said first flip-flop as an input signal and the read clock signal of the third frequency as a clock signal;

a logic gate for inverting the output signal from said first flip-flop;

an AND gate for inputting output signals from said second flip-flop and said logic gate; and a NOR gate for inputting inverted ones of the three horizontal synchronizing signals from said counting means and an output signal from said AND gate and for outputting the reset signal.

23. A line tripler for an NTSC/HDTV dual receiver according to claim 21, wherein said counting means includes:

a first counter for inputting the reset signal from said reset signal generation means and the read clock signal of the third frequency as a clock signal and for counting a predetermined number to generate a first carry signal;

a second counter for inputting the reset signal from said reset signal generation means, the read clock signal of the third frequency as a clock signal and the first carry signal from said first counter as a control signal and for counting the first carry signal from said first counter by the predetermined number to generate a second carry signal;

a third counter for inputting the reset signal from said reset signal generation means, the read clock signal of the third frequency as a clock signal and the second carry signal from said second counter as a control signal and for counting the second carry signal from said second counter by the predetermined number to output inverted ones of the three horizontal synchronizing signals; and a logic gate for inverting the output signals from said third counter to output the three horizontal synchronizing signals.

24. A line tripler for an NTSC/HDTV dual receiver according to claim 4, wherein said fifth intermediate signal generation means comprises:

reset signal generation means for generating a reset signal in response to the read clock signal of the third frequency from said clock signal generation means and the NTSC horizontal synchronizing signal from said horizontal synchronizing signal detection means; and counting means for performing a counting operation in response to the reset signal from said reset signal generation means and the read clock signal of the third frequency from said clock signal generation means and for outputting the fifth intermediate signal in accordance with a counted result.

25. A line tripler for an NTSC/HDTV dual receiver according to claim 24, wherein said reset signal generation means includes:

a first flip-flop for inputting the NTSC horizontal synchronizing signal as an input signal and the read clock signal of the third frequency as a clock signal;

a second flip-flop for inputting an output signal from said first flip-flop as an input signal and the read clock signal of the third frequency as a clock signal;

a logic gate for inverting the output signal from said first flip-flop; and an NAND gate for inputting output signals from said second flip-flop and said logic gate and for outputting the reset signal.

26. A line tripler for an NTSC/HDTV dual receiver according to claim 24, wherein said counting means includes:

a first counter for inputting the reset signal from said reset signal generation means and the read clock signal of the third frequency as a clock signal and for counting a predetermined number to generate a first carry signal;

a second counter for inputting the reset signal from said reset signal generation means and the read clock signal of the third frequency as a clock signal and for counting the first carry signal from said first counter by the predetermined number to generate a second carry signal;

a third counter for inputting the reset signal from said reset signal generation means and the read clock signal of the third frequency as a clock signal and for counting the second carry signal from said second counter by the predetermined number to output the fifth intermediate signal every one horizontal line of the NTSC video signal; and a logic gate for inverting the fifth intermediate signal from said third counter and for outputting the inverted signal as a control signal commonly to said first, second and third counters.

27. A line tripler for an NTSC/HDTV dual receiver according to claim 4, wherein said sixth intermediate signal generation means comprises:

reset signal generation means for generating a reset signal in response to the read clock signal of the third frequency from said clock signal generation means and the NTSC horizontal synchronizing signal from said horizontal synchronizing signal detection means; and counting means for performing a counting operation in response to the reset signal from said reset signal generation means and the read clock signal of the third frequency from said clock signal generation means and for outputting the sixth intermediate signal in accordance with a counted result.

28. A line tripler for an NTSC/HDTV dual receiver according to claim 27, wherein said reset signal generation means includes:

a first flip-flop for inputting the NTSC horizontal synchronizing signal as an input signal and the read clock signal of the third frequency as a clock signal;

a second flip-flop for inputting an output signal from said first flip-flop as an input signal and the read clock signal of the third frequency as a clock signal;

a logic gate for inverting the output signal from said first flip-flop; and an NAND gate for inputting output signals from said second flip-flop and said logic gate and for outputting the reset signal.

29. A line tripler for an NTSC/HDTV dual receiver according to claim 27, wherein said counting means includes:

a first counter for inputting the reset signal from said reset signal generation means and the read clock signal of the third frequency as a clock signal and for counting a predetermined number to generate a first carry signal;

a second counter for inputting the reset signal from said reset signal generation means and the read clock signal of the third frequency as a clock signal and for counting the first carry signal from said first counter by the predetermined number to generate a second carry signal;

a third counter for inputting the reset signal from said reset signal generation means and the read clock signal of the third frequency as a clock signal and for counting the second carry signal from said second counter by the predetermined number to output the sixth intermediate signal every one horizontal line of the NTSC video signal; and a logic gate for inverting the sixth intermediate signal from said third counter and for outputting the inverted signal as a control signal commonly to said first, second and third counters.

30. A line tripler for an NTSC/HDTV dual receiver according to claim 4, wherein said fourth intermediate signal generation means comprises:

a first counter for inputting the three horizontal synchronizing signals from said second horizontal synchronizing signal generation means as reset signals and the read clock signal of the third frequency from said clock signal generation means as a clock signal and for counting a predetermined number to generate a first carry signal;

a second counter for inputting the three horizontal synchronizing signals from said second horizontal synchronizing signal generation means as reset signals and the read clock signal of the third frequency from said clock signal generation means as a clock signal and for counting the first carry signal from said first counter by the predetermined number to generate a second carry signal;

a third counter for inputting the three horizontal synchronizing signals from said second horizontal synchronizing signal generation means as reset signals and the read clock signal of the third frequency from said clock signal generation means as a clock signal and for counting the second carry signal from said second counter by the predetermined number to output the fourth intermediate signal every one horizontal line of the NTSC video signal; and a logic gate for inverting the fourth intermediate signal from said third counter and for outputting the inverted signal as a control signal commonly to said first, second and third counters.

31. A line tripler for an NTSC/HDTV dual receiver according to claim 5, wherein said demultiplexing means comprises:

a first flip-flop for inputting the first write enable signal from said write enable signal generation means as an input signal and the read clock signal of one of the second and third frequencies as a clock signal;

a second flip-flop for inputting the read clock signal of one of the second and third frequencies as a clock signal and an output signal from said first flip-flop as an input signal and for outputting the first write enable signal to said memory means;

a third flip-flop for inputting the second write enable signal from said write enable signal generation means as an input signal and the read clock signal of one of the second and third frequencies as a clock signal;

a fourth flip-flop for inputting an output signal from said third flip-flop as an input signal and the read clock signal of one of the second and third frequencies as a clock signal and for outputting the second write enable signal to said memory means;

a first OR gate for inputting the first and second intermediate signals or the fourth and fifth intermediate signals from said multiplexing means;

an exclusive-NOR gate for inputting the second and third intermediate signals or the fifth and sixth intermediate signals from said multiplexing means;

a second OR gate for inputting an output signal from said exclusive-NOR gate and one of the first and four intermediate signals from said multiplexing means;

a first logic gate for inverting one of the third and sixth intermediate signals from said multiplexing means;

a third OR gate for inputting an output signal from said first logic gate and one of the first and fourth intermediate signals from said multiplexing means;

a second logic gate for inverting an output signal from said first OR gate;

a third logic gate for inverting an output signal from said second OR gate;

a fourth logic gate for inverting an output signal from said third OR gate;

a first register for inputting the output signal from said first flip-flop as a control signal, the read clock signal of one of the second and third frequencies as a clock signal, and output signals from said second, third and fourth logic gates as input signals and for sequentially outputting the first, second and third read enable signals at an initial one horizontal line of the NTSC video signal; and a second register for inputting the output signal from said third flip-flop as a control signal, the read clock signal of one of the second and third frequencies as a clock signal, and the output signals from said second, third and fourth logic gates as input signals and for sequentially outputting the fourth, fifth and sixth read enable signals at a next one horizontal line of the NTSC video signal.

32. A line tripler for an NTSC/HDTV dual receiver according to claim 2, wherein the first frequency is approximately 13.5 MHz.

33. A line tripler for an NTSC/HDTV dual receiver according to claim 2, wherein the second frequency is approximately 42 MHz and the third frequency is approximately 56 MHz.

* * * * *